United States Patent
Salam et al.

(10) Patent No.: US 6,594,654 B1
(45) Date of Patent: Jul. 15, 2003

(54) SYSTEMS AND METHODS FOR CONTINUOUSLY ACCUMULATING RESEARCH INFORMATION VIA A COMPUTER NETWORK

(76) Inventors: Aly A. Salam, 3330 Valley Vista Rd., Smyrna, GA (US) 30080; Derek W. Ziglar, 2740 Fontainebleau Dr., Atlanta, GA (US) 30360

(*) Notice: Subject to any disclaimer, the term of this patent is extended or adjusted under 35 U.S.C. 154(b) by 0 days.

(21) Appl. No.: 09/518,862

(22) Filed: Mar. 3, 2000

(51) Int. Cl.[7] .............................................. G06F 17/30
(52) U.S. Cl. ............................................................ 707/3
(58) Field of Search ................................ 707/206, 100, 707/205, 508, 3

(56) References Cited

U.S. PATENT DOCUMENTS

| | | | | |
|---|---|---|---|---|
| 408,296 A | * | 8/1889 | Doane | 96/377 |
| 5,566,330 A | * | 10/1996 | Sheffield | 707/4 |
| 5,708,825 A | * | 1/1998 | Sotomayor | 707/501.1 |
| 5,848,410 A | * | 12/1998 | Walls et al. | 707/4 |
| 5,941,944 A | * | 8/1999 | Messerly | 709/203 |
| 6,282,533 B1 | * | 8/2001 | Ramaswamy et al. | 707/100 |
| 6,483,702 B1 | * | 12/2002 | Adar et al. | 707/3 |

* cited by examiner

*Primary Examiner*—Safet Metjahic
*Assistant Examiner*—Sana Al-hashemi
(74) *Attorney, Agent, or Firm*—Needle & Rosenberg, P.C.

(57) ABSTRACT

Systems and methods for accumulating and displaying information items obtained via a computer network. A user having access to the Internet is provided, via a web site, with a plurality of selectable expert topics. Each expert topic comprises one or more network computer accessible sources of information. The user enters a user search request, selects one of the expert topics, and enters update schedule information. The user search request, a selected expert topic, and update schedule information is stored at a server site. In accordance with the update schedule information, the user search request is provided to the information sources in the selected expert topic. Raw search results from the information sources are received, stored, and processed to eliminate dead links and duplicate items. The processed raw search results are stored as search results comprising a plurality of stored search items. A predetermined subset of the stored search items is selected and communicated to the user.

16 Claims, 23 Drawing Sheets

INPUT PROCESS

MISTAKE DETECTING AGENT

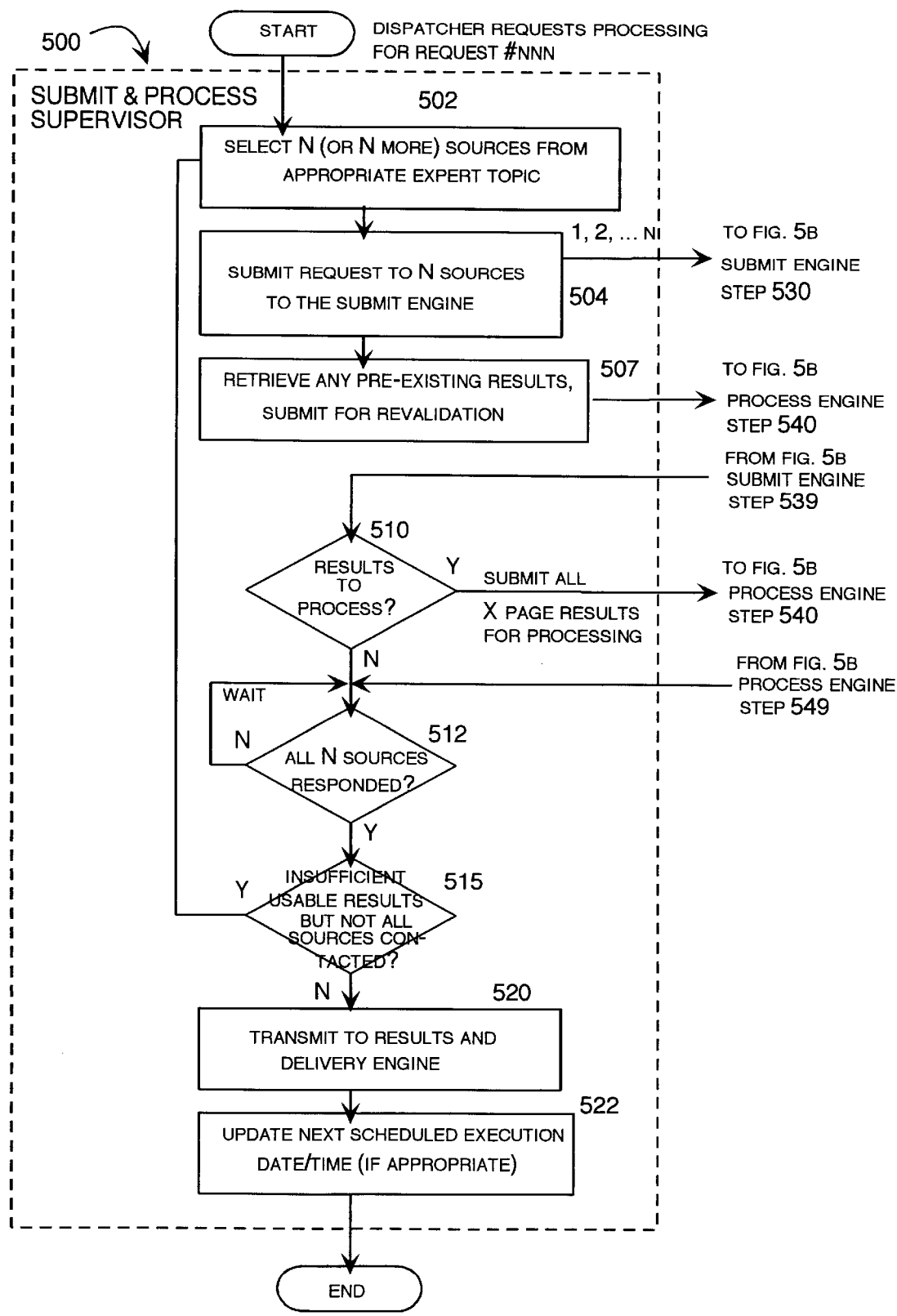
FIG. 5A  SUBMIT & PROCESS ENGINE

RESULTS & DELIVERY ENGINE

NEW SOURCE FINDER

SOURCE OPTIMIZATION AGENT

INTERFACE AGENT

SCHEDULED DISPATCH ENGINE

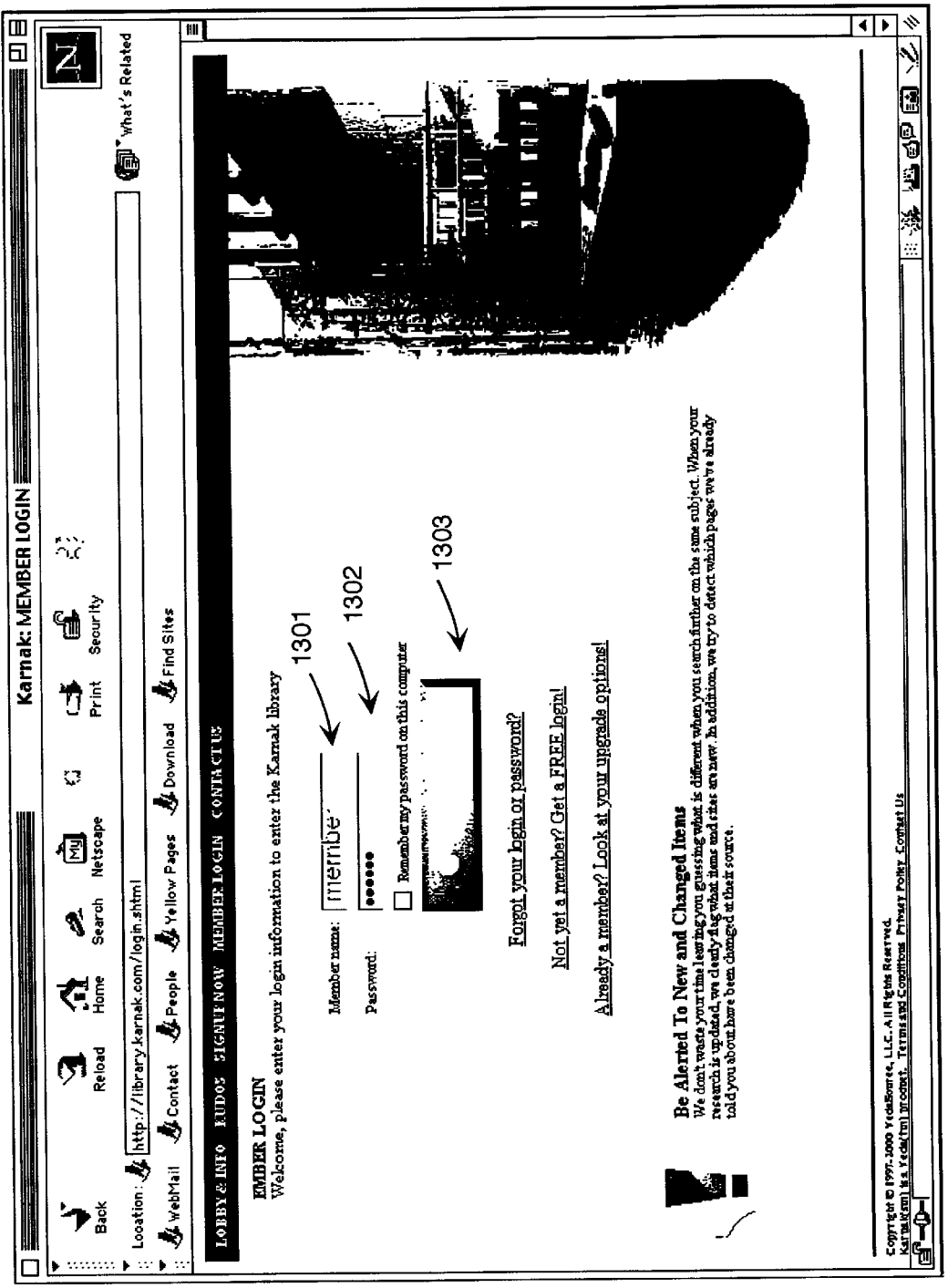
FIG. 13  LOGIN PAGE

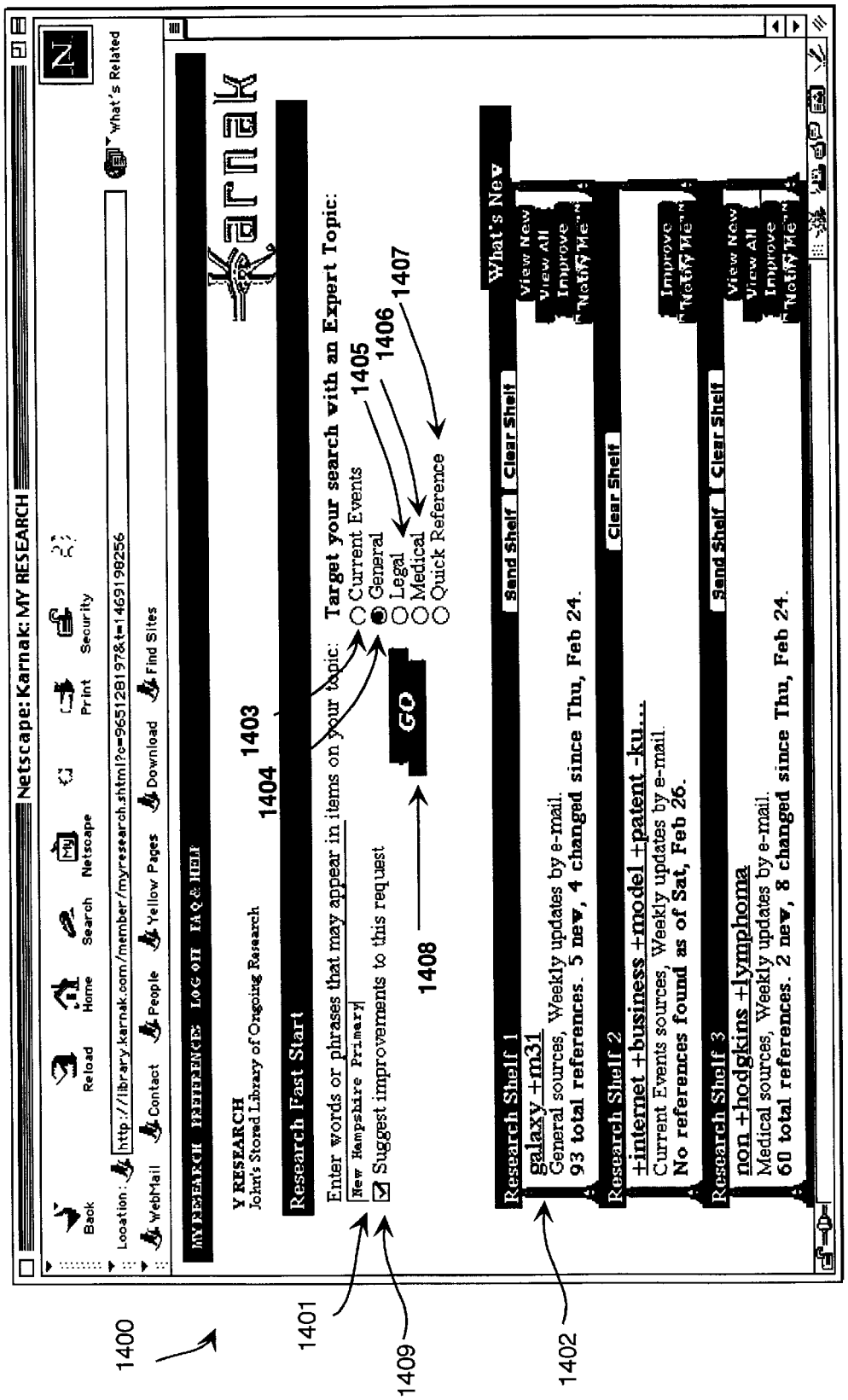
FIG. 14  RESEARCH ENTRY PAGE

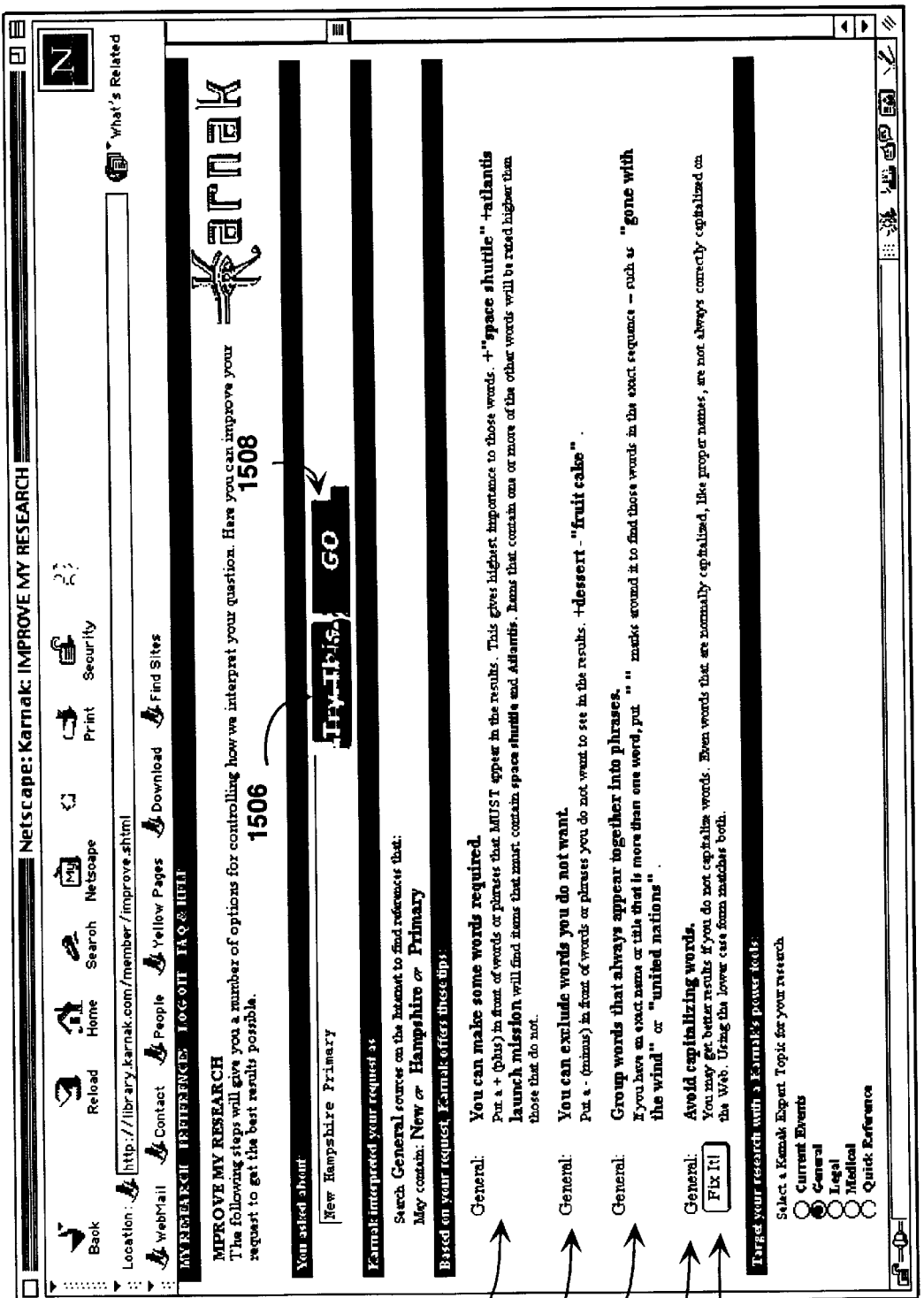
FIG. 15  SUGGEST IMPROVEMENTS PAGE

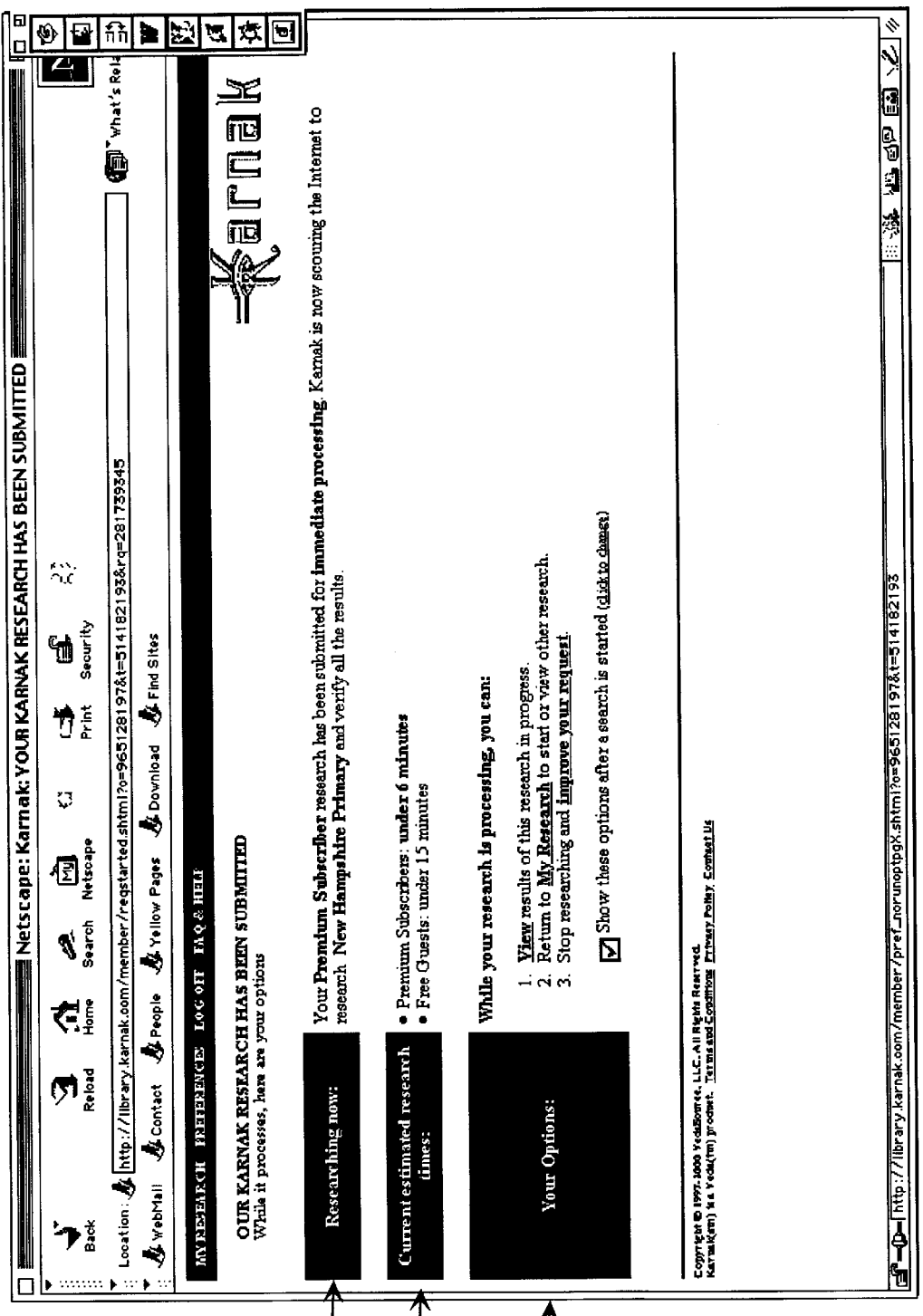
FIG. 16  SEARCH SUBMITTED PAGE & OPTIONS

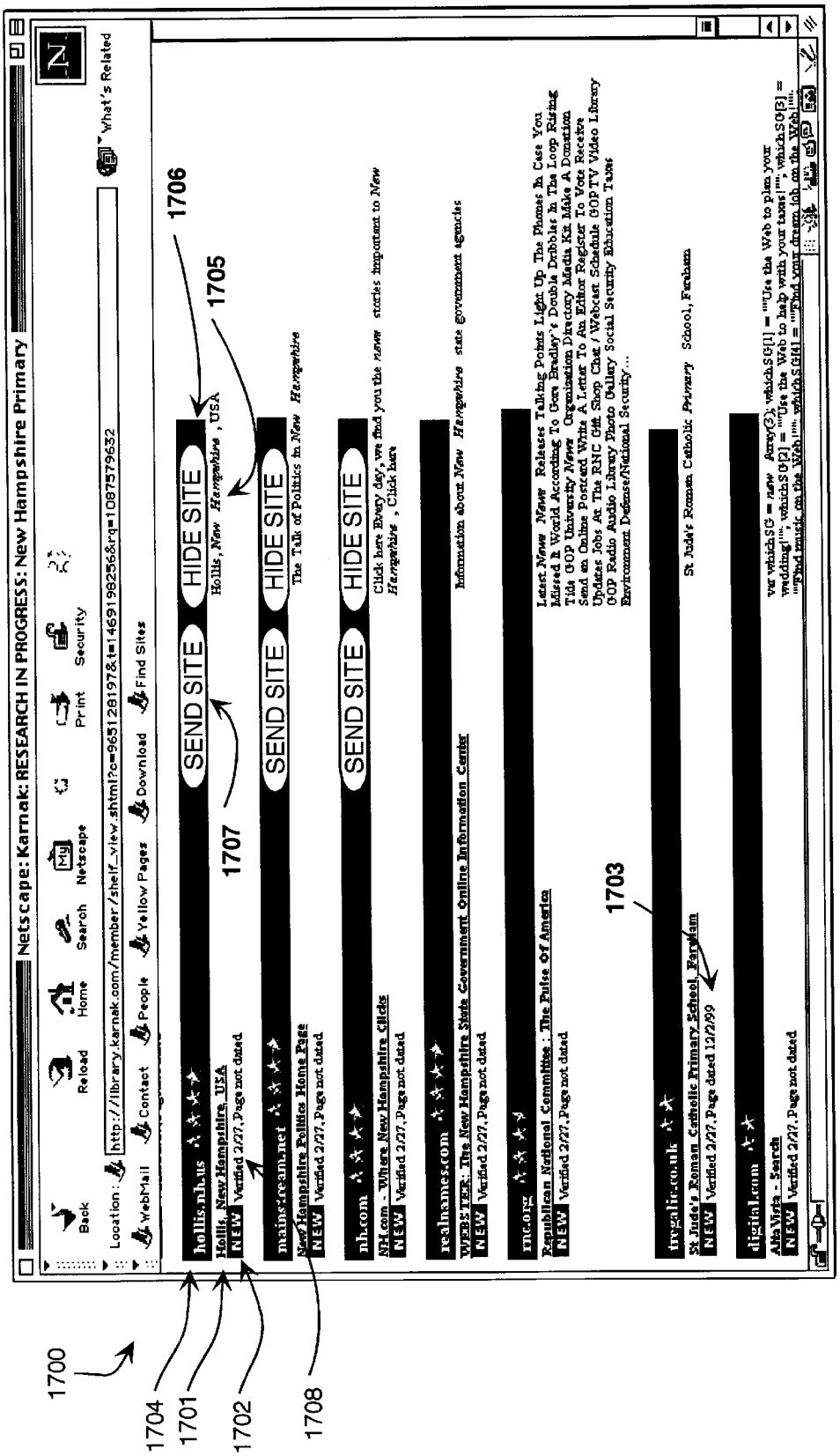
FIG. 17  SEARCH RESULTS

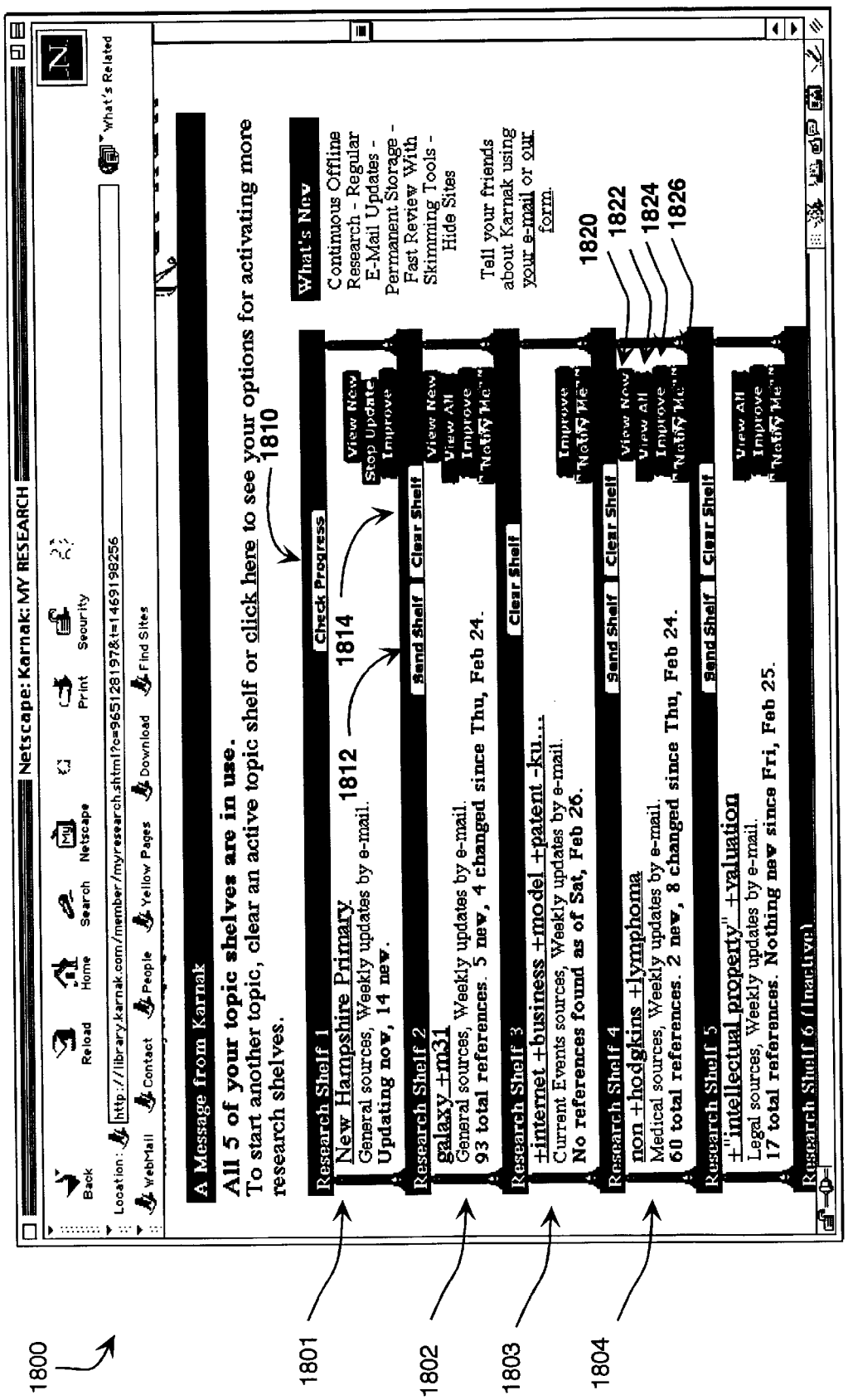
FIG. 18  MULTIPLE SHELVES

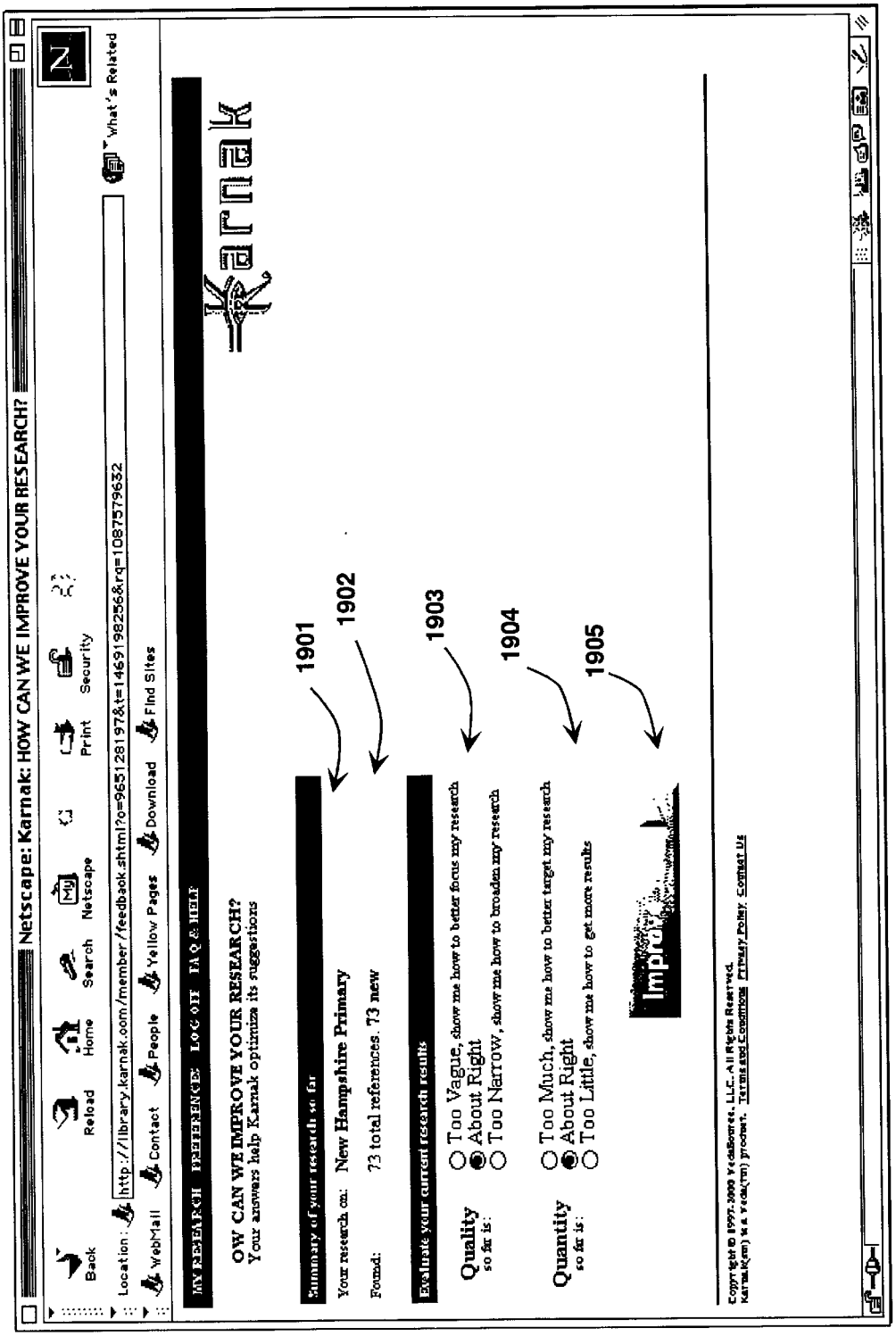
FIG. 19   QUALITY FEEDBACK PAGE

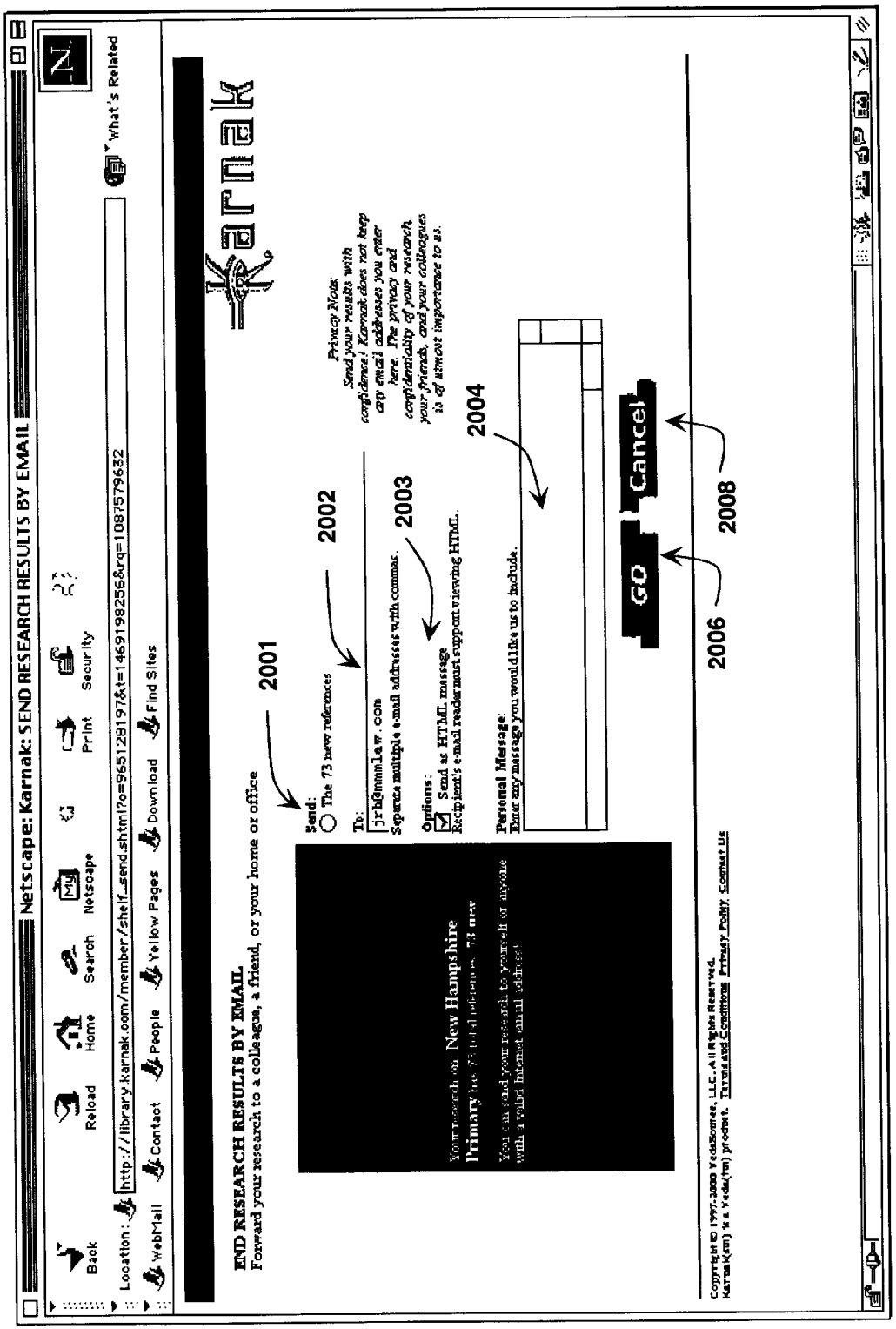
FIG. 20   SEND RESULTS BY EMAIL

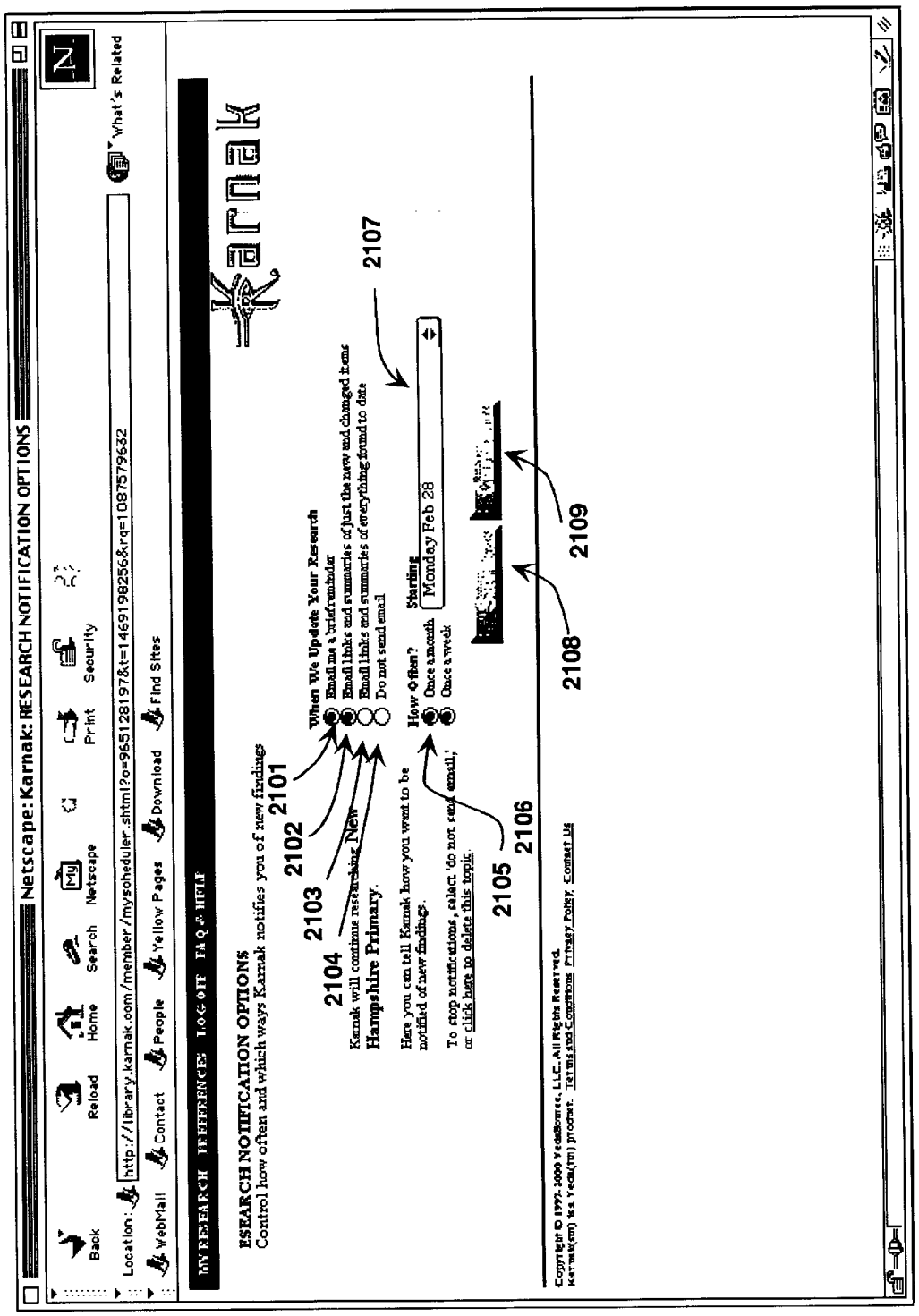
FIG. 21    NOTIFICATION OPTIONS

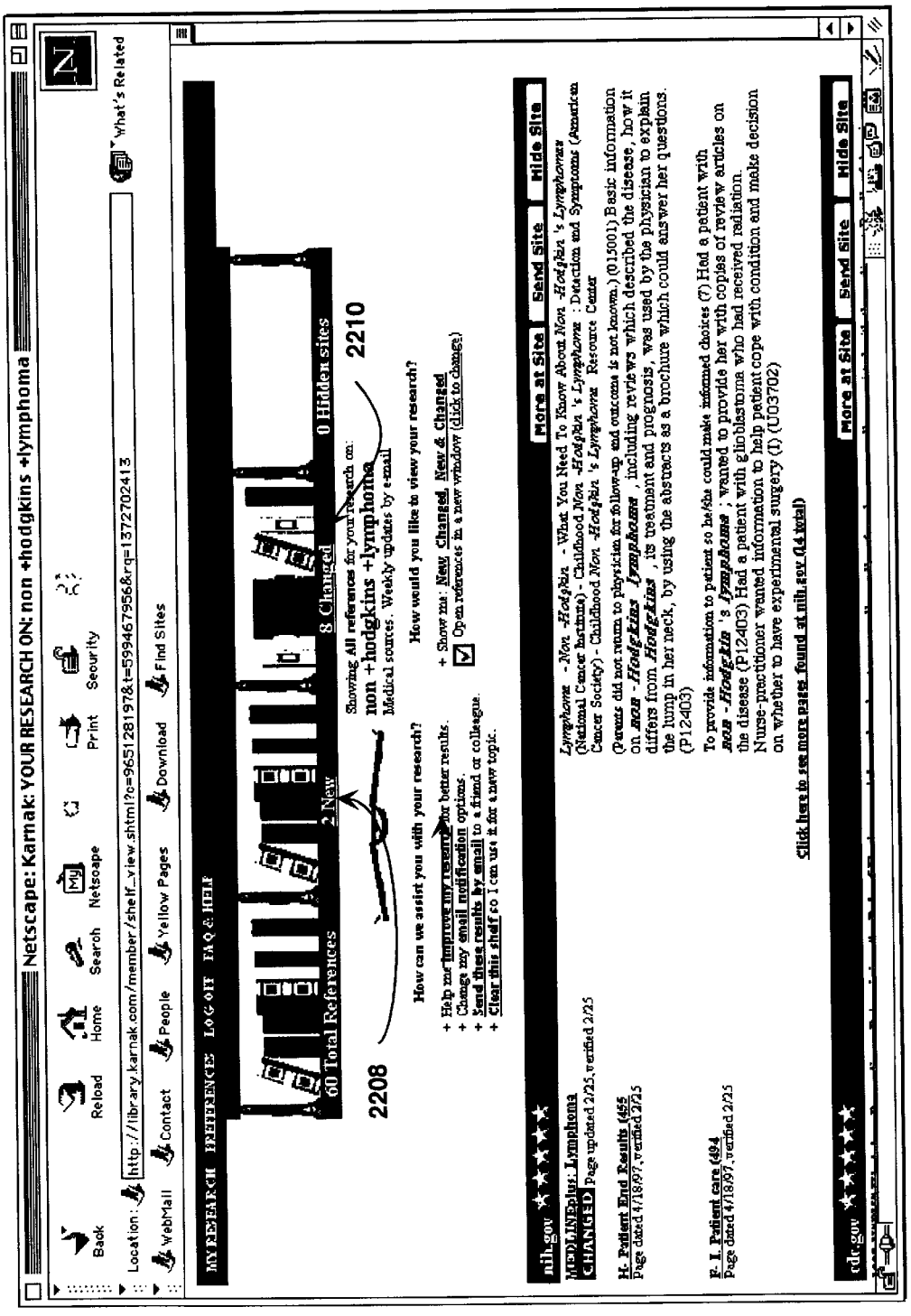
FIG. 22  NEW & CHANGED RESULTS PAGE

SYSTEMS AND METHODS FOR CONTINUOUSLY ACCUMULATING RESEARCH INFORMATION VIA A COMPUTER NETWORK

TECHNICAL FIELD

The present invention relates generally to computerized research, and more particularly relates to a system and methods for conducting research on networked computer systems, particularly Internet-based data archives, and accumulating the research information to obtain useful computerized research results.

BACKGROUND

The Internet is an immense network. As of early 2000, there are more than 100 million users accessing over 5 million active sites with over 800 million pages of information and it grows daily. That is an astounding mountain of raw data to sift through.

The Internet's greatest strength—the immense volume of information—is also the root of one of its weaknesses. Extracting specific knowledge from this vast repository of information can be frustrating and extremely time-consuming. Additionally, sites are published by thousands of people; there is no organization to this mass of information. Web pages are constantly added, deleted, updated, and moved. Finding relevant information on the Internet can be challenging in such a chaotic environment. Conventional search engines, such as ALTAVISTA.COM and YAHOO.COM, seldom find a desired answer without numerous irrelevant distractions.

There are several reasons why Internet searches are not effective. First, conventional search engines and directory services on the Internet are designed to provide instant, cursory reviews of the enormous numbers of pre-cataloged topics on the Internet. This method produces a tremendous quantity of raw and unrelated information. Generally, conventional search engines do not identify what is new or changed since the searcher last asked about the topic. Conventional search engines often return unmanageably large numbers of answers to a single question. Further, conventional engines rely on stale information—sometimes weeks to months old. Conventional search engines do not retain search results; the searcher must restart each time a search is conducted. Conventional engines work only while the searcher is online; cover a mere 20% of the available content on the Internet; only show preestablished or "canned" summaries that are frequently unrelated to the question; cannot report information that has frequently changing content; and do little or nothing to teach a searcher how to construct an effective query.

In order to perform a search with most search engines, a user typically submits a query containing one or more query terms. A query server program of the search engine then processes the query to identify any items that match the terms of the query. The results of the query is a set of web sites or documents which is typically presented to the user as a hypertext listing of the located items. If the scope of the search is large, the query result may contain hundreds, thousands, or even millions of items.

Due to the enormous and rapidly growing quantity and diversity of information accessible through the Internet, search engines generally maintain a tremendous amount of Internet content and pre-index the information to facilitate rapid searching. Therefore, when an Internet user enters a search, the search engine quickly looks into its index and tries to provide the user with a response within a few seconds. The accuracy of the information provided in the response, however, depends on the current state of the index, which may be incomplete and/or outdated.

Another class of search solution is the "meta-search engine," as implemented on sites such as DOGPILE.COM and METACRAWLER.COM. These meta-search services collect the search request from the user, then farm out the request to two or more pre-selected search engines or directories. The results returned are then rapidly repackaged and presented to the user. Various implementations perform differing levels of compiling the results before presentation. The simplest merely report the results from each search engine or directory separately. More advanced ones merge the results into a single report, eliminating duplicates.

However, meta-search engines are wholly dependent on traditional search engines and directories for their results. Meta-search engines use a similar model of providing the results as rapidly as possible to the user. Accordingly, such engines have the same search engine limitations cited above—except that by accessing the indexes of more than one search engine, they increase the potential coverage of the Internet beyond the typical 20% of a single search engine. Further, many implementations of the meta-search concept fail to adapt or optimize the user-entered search syntax to the various search engines used. Meta-search engines also use a preset collection of search engines (some provide user selection of the specific choices) which are used for all search requests.

Although existing search engines are generally useful, users interested in acquiring and compiling focused information are often inundated with too many results. Moreover, prior art search engines are ill equipped to handle the formidable task of indexing the vast amounts of developing Internet content. Indeed, because existing search engines are tailored to giving users immediate responses, those responses are often inaccurate, irrelevant, and/or antiquated. The user ultimately takes the brunt of any errors, inaccuracies, and outdated information. Specifically, users are often presented with duplicative search results (i.e., the same found item may appear on one or more different web sites), or dead links (which generate the dreaded "Error 404", which means that the information, although indexed, is no longer available at the site that generated the index entry). In addition, search engines provide only one tool for actually conducting a research project.

Human beings traditionally conduct research in a manner that is not facilitated by present Internet search engines. Just like in conventional library research, people typically conduct research by (1) attempting to identify one or more authoritative sources of information, (2) locating and querying those sources, (3) inspecting manageable collections of information provided by the sources, (4) taking notes on the information (e.g. by writing on an index card), (5) "filtering" the information by categorizing the cards as a function of quality or state of currency or completeness, etc., (6) selecting and retaining those items of information that satisfy the researcher's goals, and (7) repeating the previous steps as necessary to achieve sufficient information to meet both initial research goals and to obtain informative updates over duration that the topic continues to be of interest or importance. The final research product is the result of selection of the most relevant items of information from the various sources.

As described above, existing Internet search engines only provide the user with a list of possible sources of information (i.e., a list of static items that have been indexed a day, a week, or may be a month ago). The list provided by an existing search engine is much like providing a library user with a listing from a card catalog. For example, like a card catalog, a list of sources only informs the user that there may be information available on a particular research topic. It does not provide the user with any additional assistance. The user is left to hunt down whether the information is still available and if so, determine whether it is truly relevant to the researched query.

Furthermore, while existing Internet search engines provide instantaneous responses, they do not provide users with any continuity of use, or adequate means for filtering the irrelevant information, or adequate means for determining quality of the seemingly relevant search results, or adequate means for retaining relevant findings. In other words, prior art search engines do not maintain a relationship with any one user and are therefore unable to identify one user from another. Accordingly, when a user enters a follow-up search request to obtain updated information from a past search, existing search engines will likely reproduce duplicate items. The user must then sort through all the duplicate items to determine if the search results contain any new or updated information. This has proven a difficult and tedious task for serious Internet researchers.

In addition, prior art search engines generally attempt to accomplish their request processing in the background. Some of these search engines recognize common mistakes that users make, but they attempt to program their systems to work around them. They use technological tricks such as ignoring certain words and punctuation marks to "second guess" the user and form a better request. This approach, however, fails to teach users to create better requests and fails to provide them tangible feedback on what to do different to get closer to their research objectives.

Therefore, there is a need for a searching tool that is directed to the problems of finding too much irrelevant information on the Internet as well as managing the volume of information that a user gathers on the Internet.

There is a further need for a searching tool that can contemporaneously index developing Internet content.

There is yet another need for a searching tool that provides the user with additional assistance for determining the initial relevancy of each located item to the researched query.

Additionally, there is a need for a searching tool that tracks and maintains a history of each user's searches and results.

There is still an added need for a searching tool that teaches the user to independently enter a better request.

There is a further need for an improved searching tool that can continuously provide a user with new and updated information based on a previous search request.

SUMMARY OF THE INVENTION

Briefly described, the present invention relates to systems and methods for conducting computerized research with a knowledge engine, especially suitable for the Internet environment, that operates in a manner similar to that of a human being searcher in a library. A system constructed in accordance with the invention helps searchers find and accumulate a personal library of knowledge; hence the term "knowledge engine" as opposed to search engine. Because the present invention was designed for research, not cursory searches, it does a lot more than just find information. A system of the invention compiles information from multiple sources, weeding out obviously bad information, storing findings in a personal library on "bookshelves," and provides a searcher with a summarized, condensed, and highlighted report of the search results.

More particularly described, the present invention provides a system and methods for accumulating and displaying information items obtained via a computer network such as the Internet and World Wide Web (WWW). The system provides a plurality of selectable expert topics, each expert topic comprising one or more network computer accessible sources of information. A user inputs a user search request, a selection of one of the plurality of expert topics, and update schedule information as to when the user wishes to receive automatic updates to their search. The user search request, a selection of one of the plurality of expert topics, and update schedule information are stored at a web site server.

In accordance with the stored update schedule information, the user search request is provided to the information sources in the selected expert topic. Raw search results from the information sources are received and processed to eliminate dead links and duplicate items. The processed raw search results are stored as stored search results comprising a plurality of stored search items. A selected predetermined subset of the stored search items is selected for communication to the user. The predetermined subset of stored search items is then communicated to the user, e.g. by e-mail, pager, cell phone.

The system is further operative for receiving user commands to hide selected items of the predetermined search results, such that the user is not displayed hidden selected items, but the selected items remain stored as stored search results.

Preferably, the stored search results are updated automatically with new search results with an updated search conducted in accordance with the update schedule information. Typically, users of the updated search results will be notified by via e-mail, although other equivalent methods exist.

According to an aspect of the invention, new search item are determined in the updated search, and the new search items are identified in a communication to the user.

According to another aspect of the invention, changed search items in the updated search are determined, and the changed search items are identified in a communication to the user.

According to yet another aspect of the invention, unavailable search items in the updated search are identified (e.g. "Error 404"), the unavailable items having been available in a prior search. The unavailable items are preferably deleted from the subset of information provided to the user.

According to yet another aspect of the invention, stored search items are analyzed, typically off-line, and information sources are identified as potential new sources.

According to another aspect, statistics are tabulated corresponding to the quality of information provided by an information source, in association with a selected expert topic. A ranking is assigned to the information source, and information items from a source of higher ranking to the user are displayed before displaying information from a source of lower ranking. Preferably, information items from an information source are displayed to the user in a collection associated with information identifying the information source.

According to yet another aspect of the invention, potential new information sources are identified from the stored search results, and tested as potential new information source. The invention provides for automatically determining the interface parameters associated with the potential new information source.

Finally, the preferred embodiment provides a user-friendly web site for interacting with the user to modify the search request to obtain better search results.

The disclosed system uses hundreds of web sites to cross-reference topics, verify Internet sites and pages, and requested information, and sort out non-pertinent links. Unlike many conventional search engines, the disclosed knowledge engine:

Eliminates dead links,

Reduces or eliminates questionable links,

Creates customized and relevant summaries,

Creates email notification and updates,

Stores research results in a "personal library,"

Is accessible anywhere the searcher can connect to the Internet,

Alerts the searcher to new and changed items, and

Accesses pages with rapidly changing content that cannot be indexed by search engines.

More particularly described, the present invention is directed to a system and methods for continuously accumulating information. More specifically, the present invention of a "knowledge engine" emulates and automates the process that a human researcher uses in gathering information. For purposes of this discussion, the term "knowledge engine" will be used in connection with discussion of the present invention in order to distinguish the present invention from prior art "search engines."

Preferred embodiments of the present invention are constructed around a computer system operated by an Internet-based research service provider, the system including an Internet World Wide Web (WWW) front end that allows users to enter a search request. To start with, the system receives a user's search request and provides the user with query feedback and recommendations on how to optimize that request. For example, the recommendations may involve syntax, spelling, and/or recommendations on the use of terms. These recommendations help the user optimize the search query and gain better results.

The knowledge engine then submits the search request to a number of sources it has previously identified on the Internet and retrieves the information available from those sources. For the purposes of this discussion, a "source" is considered to include any computer-accessible site that can be queried via a network connection. In other words, a source must provide information and the capability to search that information (whether indexed or via other means). According to one aspect of the invention, the knowledge engine can be viewed as a dynamic "index of indexes." For example, the knowledge engine will index the index provided on sites such as CNN.COM, BRITANNICA.COM, and ESPN.COM. Some sites such as ESPN.COM, which can itself be a source, and other sites that present continuously changing content provide contemporaneous updates, such sites are therefore considered "dynamic." Other sources do not change as rapidly, or may not change at all (e.g. archived content), and may be considered "static." The preferred knowledge engine has access to both static and dynamic Internet information.

To better understand the significance of dynamic indexing, consider the following example. Assume that a knowledge engine constructed in accordance with the invention receives a request at noon for information on an event that happened in the world earlier that day. Traditionally, if CNN.COM posts the desired information on its site at 11:00 A.M., existing search engines that index static information may have to wait a week before they are able to provide that new information. This is because existing search engines must retrieve, store, and index the information before it can be provided to a user. In contrast, a knowledge engine system constructed in accordance with the invention does not have to obtain and index the information in advance and can therefore provide the user with current information through dynamic indexing.

In accordance with the preferred embodiment of the present invention, the knowledge engine not only dynamically searches the Internet to collect the sites where information may be found, it also examines the content of those sites to determine the information's relevancy and accessibility. Thus, the user is not flooded with copious results containing duplicate sites, dead links, and inapplicable content.

According to one exemplary aspect of the present invention, the knowledge engine transmits the ensuing results to the user and displays them in a context sensitive fashion. In other words, the results are provided with highlighted portions of each site's most relevant content. This allows the user to make a ready determination as to the importance and/or relevance of each finding. Moreover, the knowledge engine provides the user with additional research management functions that allow the user to efficiently manage the received information. For example, such research management functions include the capability of hiding and unhiding items on a list of search results. Hidden items are not deleted from the list of search results (much as one might not throw away the collection of research note cards). Rather, the items are preferably selectively obscured from view so that the user can concentrate on selected visible items. By hiding items instead of deleting them, the present invention prevents those items from reappearing by being "re-found" when research is updated for the user.

According to yet another aspect of the invention, after the search results have been provided to the user, the knowledge engine may be configured to periodically reevaluate the sources to determine whether they contain additional information that might be relevant to the user's initial search. Additional information is provided to the user through various means, for example, via electronic mail (e-mail) updates that are scheduled on a periodic basis or that notify the user to visit a master web site containing the user's collection of search items. The reader should also appreciate that the user may be contacted in alternative ways, such as via an Internet site, PDA, telephone, pager, or other equivalent communication means.

According to yet another aspect of the invention, the knowledge engine employs an intelligent automated process that searches the Internet for additional sources, in addition to transmitting periodic updates to the user. All sources are maintained in a sources database containing source address information (e.g. URL), as well as source quality information and expert topic categories, and expert topic relevance. Sources are re-evaluated from time to time, and their associated quality information and expert topic categories revised.

Further still, once a potential new source is discovered, the knowledge engine determines how to interface with the source by testing and evaluating the source. More particularly, the knowledge engine finds the source and issues a command to find the "search box," which is typically the field that is used to enter a search request to the source. Once the search box is found, the knowledge engine may iteratively enter model search requests, receive the results from the issued requests, and analyze the results. These analyses allow the knowledge engine to determine how to interface with the source (e.g., how to communicate back and forth, pass the results, and how to deal with the information that is received from the source).

According to still another aspect of the invention, a plurality of information sources are precategorized into predetermined "expert topics" so as to facilitate targeted research that pertains to selected topical area. For example, selected sources may be arranged into expert topics on law, science, medicine, computers, communications, history, business, etc. Then, on a regular basis, the sources within an expert topic database are reevaluated to determine if the source site setup has changed; and, if it has changed, in most cases, the knowledge engine automatically detects the new structure and adapts to it. As a result of the process of finding more sources, evaluating and testing those sources, and reevaluating the existing sources, the knowledge engine generally locates additional potential sites. These sites are then considered for inclusion into the source database.

In the preferred embodiment of the present invention, once a source is located and tested, it is placed within an "expert topic." An expert topic is a group of sources that have a common theme. For example, all medical sources may be grouped together in a medical expert topic. Since there are hundreds of sources, it is not feasible, practical, or productive for every request to be submitted to every source available to the knowledge engine. Therefore, the knowledge engine submits the search to concentrated subject groups known as expert topics. The reader should appreciate that it is not necessary for the knowledge engine to mandate the expert topic because the user may choose to select the user's preferred topic. Moreover, it is also possible for the users to contribute and suggest additional expert topics.

Other goals, features, and advantages of the present invention will become apparent upon reviewing the following detailed description of the preferred embodiments of the invention, when taken in conjunction with the drawings and the appended claims.

BRIEF DESCRIPTION OF THE DRAWINGS

FIG. 13 illustrates the graphical interface of a login page for an exemplary knowledge engine constructed in accordance with the invention.

FIG. 14 illustrates a research entry page for the exemplary knowledge engine.

FIG. 15 illustrates a suggest improvements page for the exemplary knowledge engine.

FIG. 16 illustrates a search submitted page for the exemplary knowledge engine.

FIG. 17 illustrates a search results page for the exemplary knowledge engine.

FIG. 18 illustrates multiple research shelves employed in the exemplary knowledge engine.

FIG. 19 illustrates a quality feedback page for the exemplary knowledge engine.

FIG. 20 illustrates a send results page for the exemplary knowledge engine.

FIG. 21 illustrates a notification options page for the exemplary knowledge engine.

FIG. 22 illustrates a new and changed results page for the exemplary knowledge engine.

DETAILED DESCRIPTION

Figure 1:
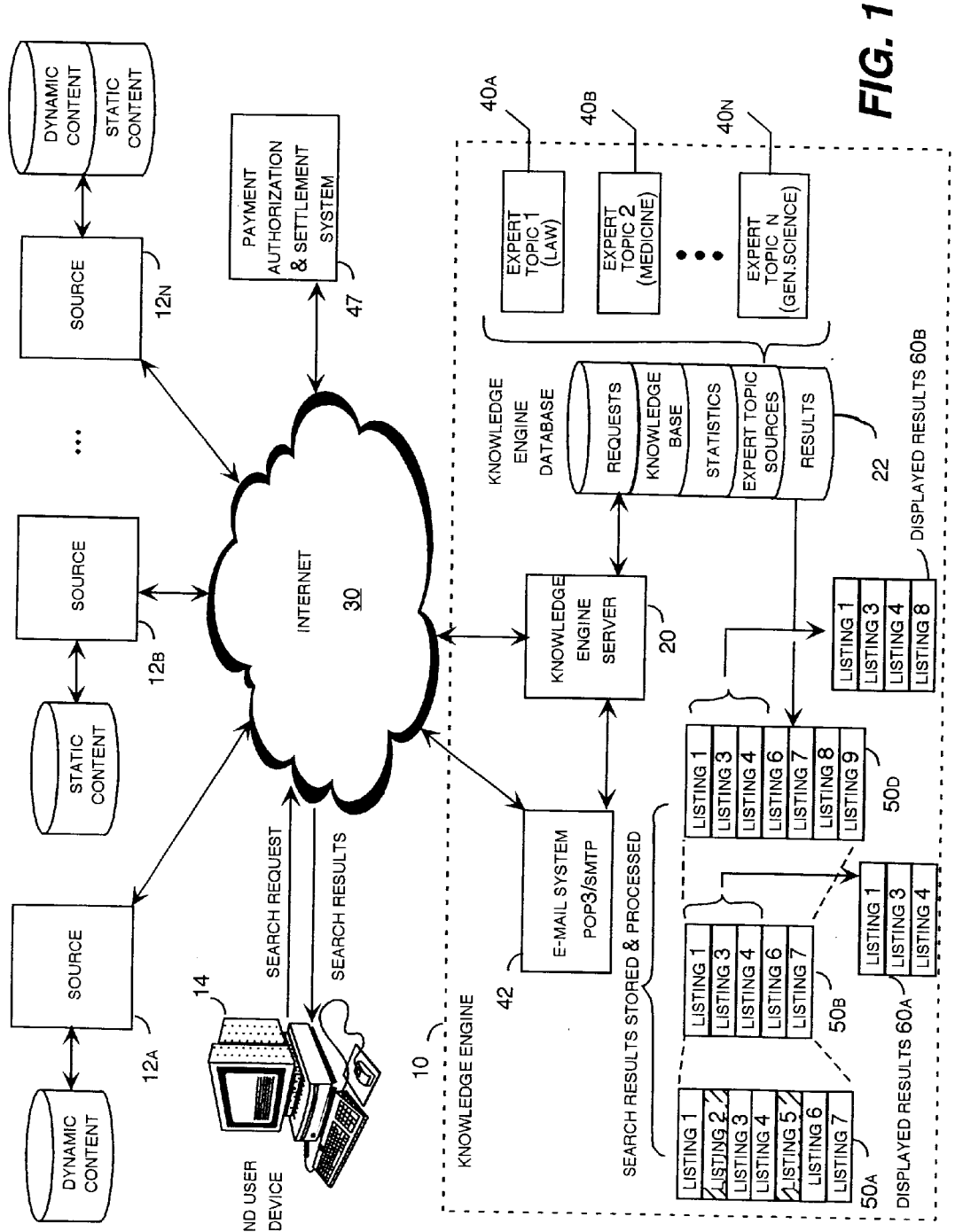
FIG. 1 illustrates a networked computer research environment in which the preferred embodiment of a knowledge engine constructed in accordance with the preferred embodiment of the present invention is operative.

Referring now to the drawings, in which like numerals represent like elements throughout the several figures, aspects of the present invention and the illustrative operating environment will be described. In general, FIG. 1 and the following discussion is intended to provide a description of a suitable environment and system in which the methods of the invention may be implemented and of the architecture of a preferred embodiment of the invention as a system. More particularly, FIG. 1 is an overview of a typical application of a knowledge engine system 10 constructed in accordance with the preferred embodiment of the present invention. The knowledge engine 10 is accessed by users employing end user devices 14 such as personal computers (PC), personal information managers (PIMs) or personal digital assistants (PDAs), wireless telephones with computing capability, or other computing devices, all of which are considered equivalent.

The knowledge engine 10 comprises a knowledge engine server 20 constructed with one or more commercially available server computers connected for cooperative operation and data storage. A knowledge engine database 22 is operatively coupled to the server 20 for storage of information required to handle a plurality of search requests, and resultant search results, for a plurality of users. In particular, database 22 stores information corresponding to (a) a plurality of sources of information for use in searching, in the form of a sources database, (2) a plurality of expert topics with which one or more of the sources 12 are associated, in the form of an expert topics database, (3) a user results database for storage of search results lists associated with particular users or "subscribers", and (4) a users administrative database for handling user identification information, billing, passwords, etc. As will be known to those skilled in the art, these various database functions may be implemented on one or more computers forming the knowledge engine 10, as a function of cost and performance tradeoffs.

Aspects of the present invention may be implemented in a distributed computing environment such as the global computer network commonly referred to as the "Internet" 40. The knowledge engine server 20 is connected to a plurality of information sources 12, shown connected and accessible via the Internet 30, although it will be understood that information sources may be accessed by other communication means such as direct connections, wireless networks, public telephone company ("telco") connections, proprietary networks, and other methods of connecting computers for communications, which are deemed equivalent for these purposes. Sources 12a, 12b, . . . 12n are shown as examples of a dynamic source, a static source, and a combined dynamic/static source, respectively.

It will be understood that in the example being described, a "source" is typically an Internet connected and accessible computer system that retrievably stores information, which information can be retrieved upon provision of an appropriate inquiry or "query" in a standard HTML form request format, using the parameters usually demonstrated by the site's own "search box." For example, a source could be a web site of a dynamic information source such as CNN.COM, or a search engine such as ALTAVISTA.COM or NORTHERNLIGHT.COM, or a metasearch engine such as DOGPILE.COM, or a site of multiple static web pages made available by an individual or a company or a university where the web pages contain their own searchable index or can be indexed by a third-party.

Information identifying a plurality of sources is stored in the knowledge engine database 22 as a plurality of data entries, each entry comprising a network address or URL of the source, as well as other associated information such as source quality indication information and expert topic association information.

The knowledge engine database 22 further stores information corresponding to one or more expert topics 40a, 40b, and 40n. In accordance with the invention, the sources 12 are preferably grouped according to subject areas, for example expert topics for law 40a, medicine 40b, . . . general science 40n. For example, a source that provides pharmaceutical information may be included within the expert topic of medicine. It should be understood that a source lo containing information covering multiple disciplines or topics may be included in multiple expert topics, for example, a source that provides information about treatments for cancer may be classified as a source for the "medicine" expert topic 40b as well as for the "general science" expert topic 40n.

In accordance with the invention, a user may select an predetermined expert topic in connection with a search, or may create their own expert topic, so as to improve the prospects for obtaining meaningful search results.

Still referring to FIG. 1, the knowledge engine server 20 is shown directly connected to Internet 30. The direct link is shown to indicate the capability of the knowledge engine server 20 to search the Internet 30 for new sources, access known resources for research processing, and to communicate directly with end users 14.

In addition, the knowledge engine server 20 is operatively coupled to an e-mail system 42 for communications with users. For example, the e-mail system may comprise a conventional POP3/SMTP e-mail server well known to those skilled in the art, which allows the sending and receiving of e-mail to and from users. In accordance with the preferred embodiment of the invention, users may select various forms of e-mail communication containing notification of updates to their research, including but not limited to e-mail notifications or partial or full listings of research findings on a regular basis or other basis. However, it will be appreciated that other forms of notification for receipt of information about their searches and search results are also possible, e.g. notification by a non e-mail type communication delivered to a user's computer, paging, FTP to a server of a user's choice, online html displays, voice response, personal digital assistant (PDA) or personal information managers (PIM) connected for communications, cellular telephones, and pagers.

Furthermore, the knowledge engine server 20 is operatively coupled to a payment system 45 that handles accounting for users of the system, obtaining authorization for charging a user's credit card or other prearranged account, and payment settlement. The server 20 communicates with a payment authorization and settlement system 47 in the known manner, through the Internet 30 or via a private data communications link (not shown). Although not shown, it will be appreciated that the system 10 permits a user to be charged for use of the research service, with payment to be provided through a payment web page operated in association with the system. Construction and use of a payment system 45 useful in the present invention is known to those skilled in the art and will not be discussed further herein.

According to one aspect of the invention, knowledge engine 10 is operative to receive a search request from a user via their end user device 14, locate relevant information pertaining to that search request, and transmit that information to the user. For example, in the preferred embodiment of the present invention, a user may use a computer, such as end user device 14, to request the knowledge engine 10 to commence a search of the Internet 30 for some desired information. Typically, such communications are sent via the Internet 30 to the knowledge engine 10 using protocols well known to those skilled in the art such as hypertext transfer protocol ("HTTP"), but those skilled in the art will appreciate that such requests may be transmitted through other means, such as electronic mail, file transfer protocol ("FTP"), other protocols well known to those skilled in the art, and any new or modified protocols for computer communications that become available.

In accordance with the preferred embodiment of the present invention, and as shown in FIG. 1, the search request is received by knowledge engine server 20, processed by reference to selected sources within a selected expert topic 40 (e.g. 40b, for medicine) and a first set of raw search results 50a are stored, assembled, and verified in the manner which will be described. The first set of search results 50a which includes listings 1–7 are processed to obtain a second set of results 50b. It will be noted that the second set 50b does not include listings 2 and 5, which might be dead links for example. A third set of results 60a is selected from the stored second set 50b, e.g. listings, 1, 3, 4, and formatted for communication to the user, typically by e-mail, and are displayed on the user's computer device 14, or by other means. A fourth set of search results 50d, which includes new listings 8 and 9, may be obtained by an update to the search conducted in accordance with schedule information. A fifth set of search results 60b, e.g. items 1, 3, 4, and 8, is selected from the stored updated results 50d to reflect the updated search, formatted, and communicated to the user.

In further accordance with the invention, the search results initially comprise a first set of search results 50a which represent a "master" or original collection of search results. This initial or first set 50a is preserved and stored in the knowledge engine database 22, in association with the particular user's search request. New results are added from time to time as new results are obtained (e.g. set 50d); likewise, entries in the first set (e.g. listings 2 and 5)are removed from the initial set 50a from time to time as results are proven to be dead links, irrelevant, etc. The search results may be further processed by "hiding" or "unhiding" selected entries, in response to user commands.

Figure 11:
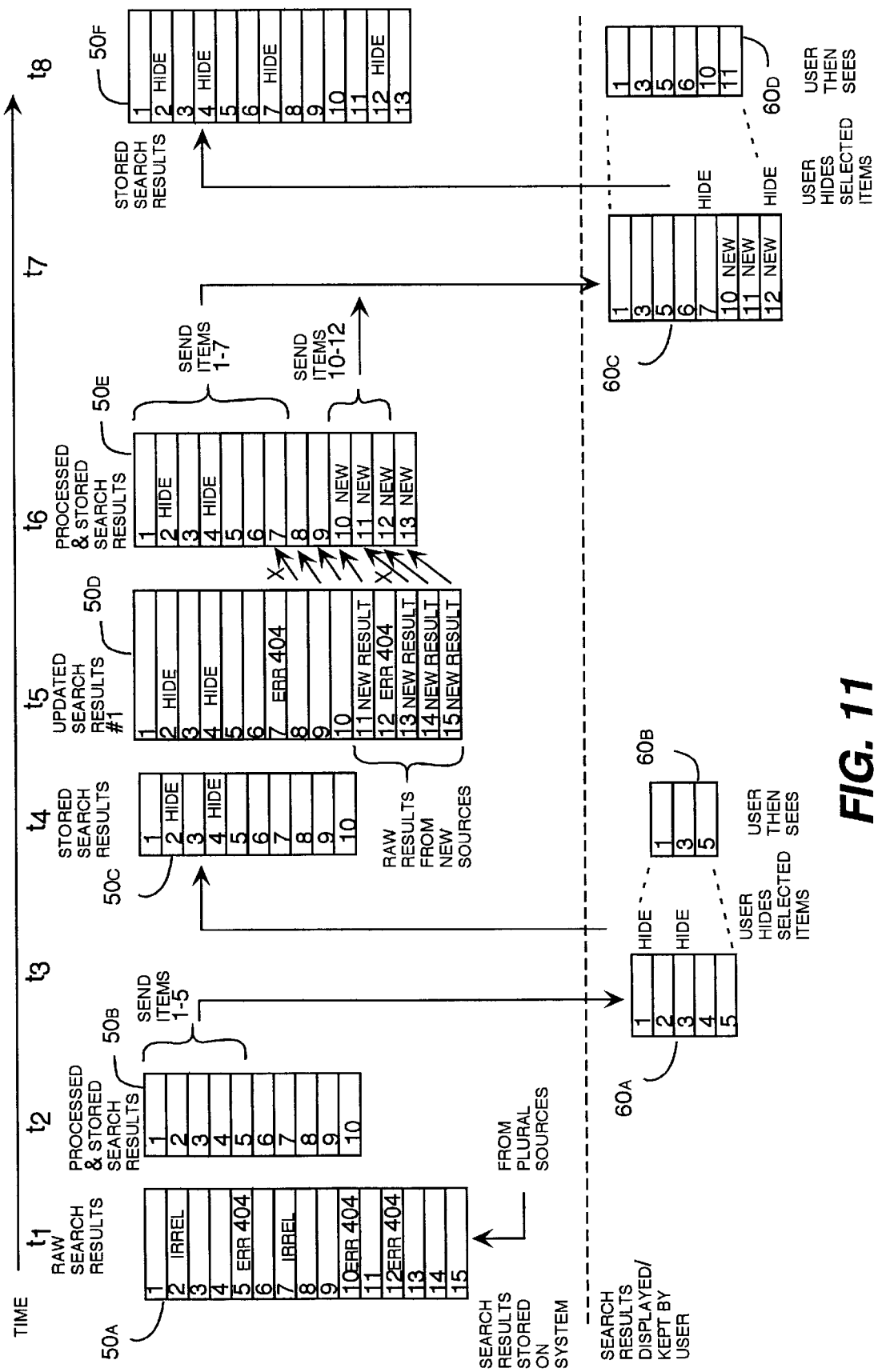
FIG. 11 graphically illustrates an exemplary set of research results produced by a knowledge engine constructed in accordance with the invention.
Figure 12:
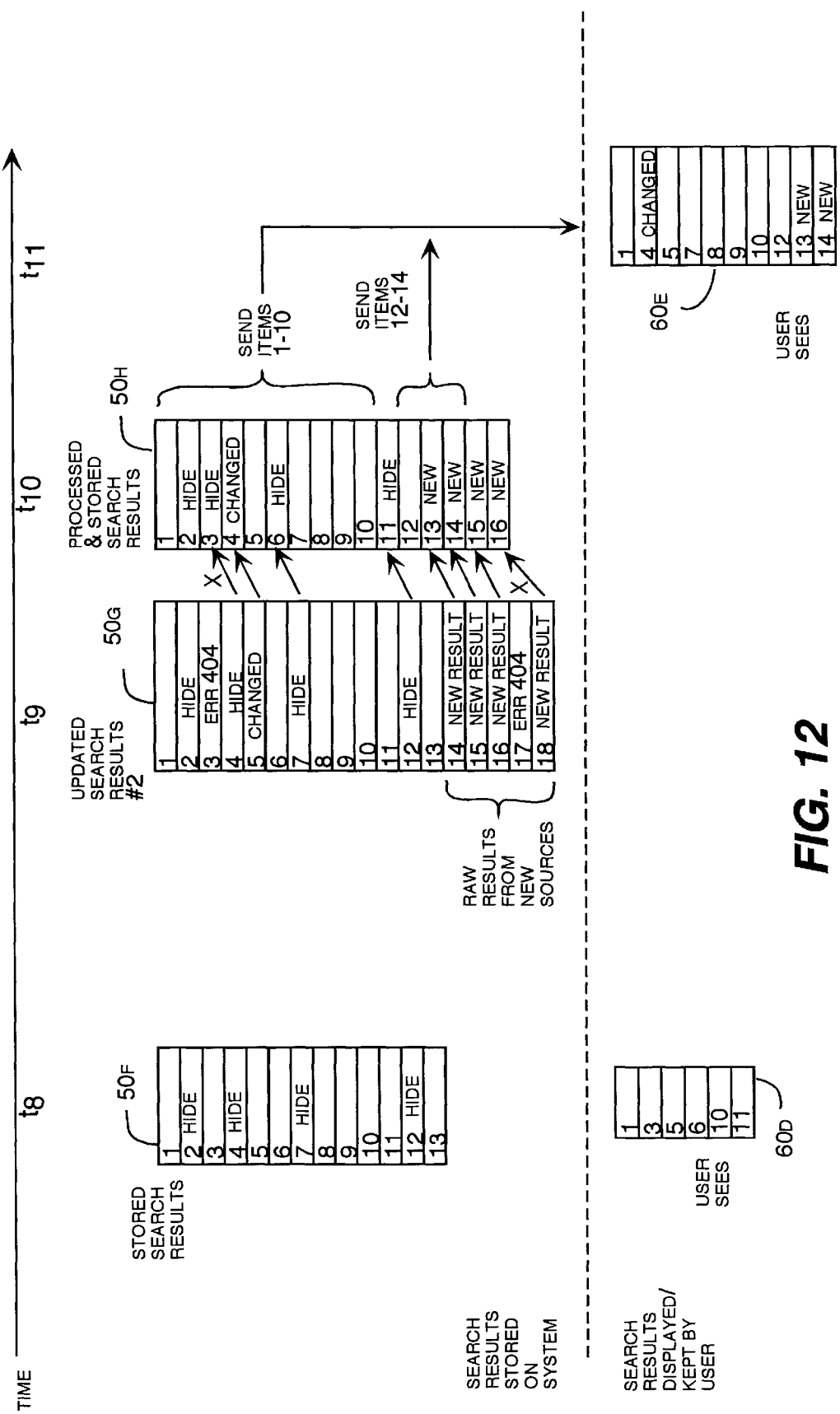
FIG. 12 further graphically illustrates the exemplary research results of FIG. 11, with subsequent update.

Further details of the selected sets of search results and display of search results is provided in FIG. 11 and FIG. 12 and the corresponding discussion.

Processes for Searching with Knowledge Engine

Figure 2:
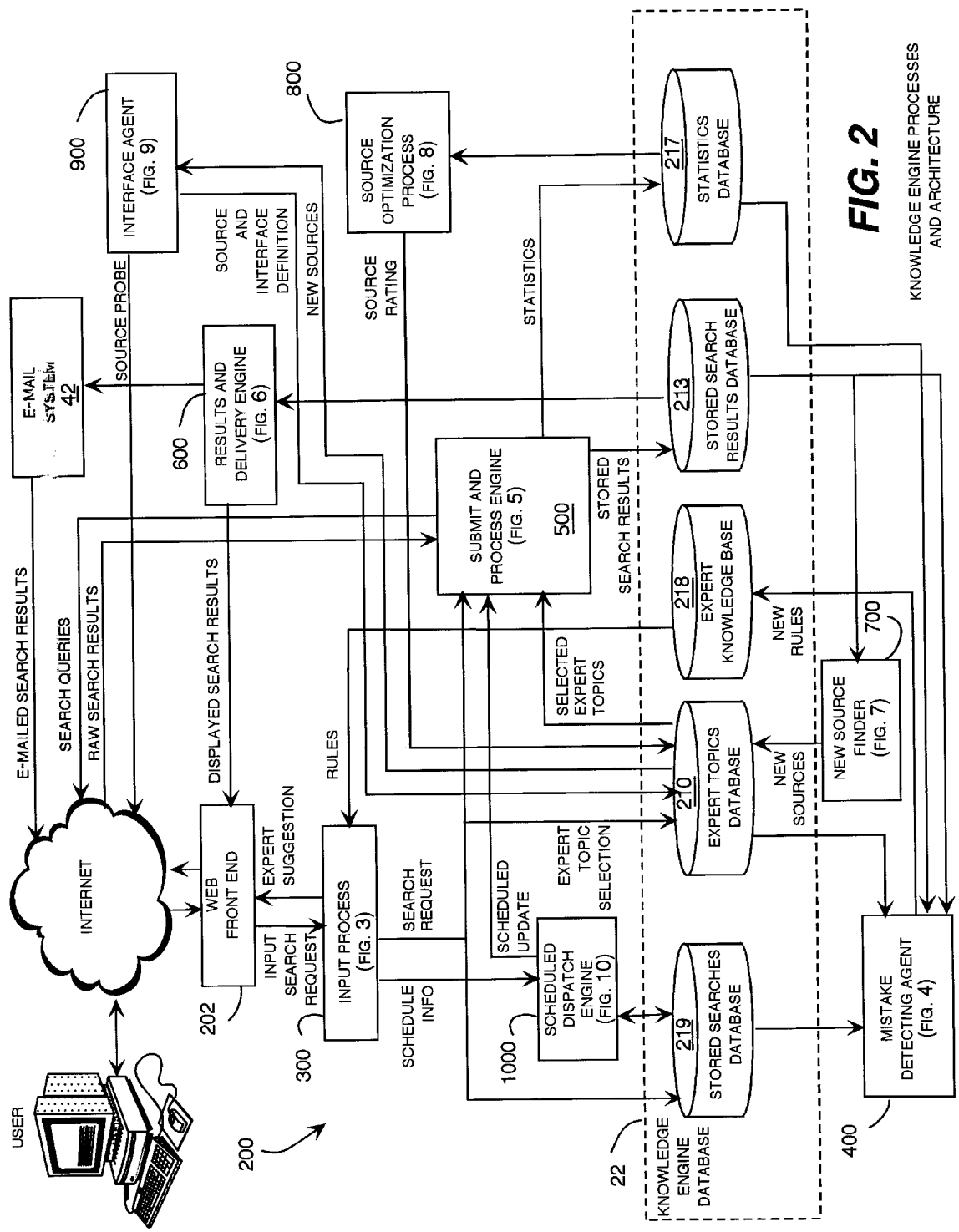
FIG. 2. Illustrates various processes and architecture of a knowledge engine constructed in accordance with the preferred embodiment of the present invention.

Turn next to FIG. 2 for a discussion of the first of a series of various computer-implemented processes for carrying out the methods of the present invention utilizing a system 10 constructed in accordance with the disclosed embodiments of the present invention. Although the preferred embodiments will be generally described in the context of an Internet-accessible personal computer (PC) 14 operated by a user and the Internet-accessible server-based computer system 10 implementing aspects of the knowledge engine system 10, those skilled in the art will recognize that the present invention can also be implemented in conjunction with other program modules or routines for other types of computers. Furthermore, those skilled in the art will recognize that the present invention is preferably implemented in a distributed computing environment such as the Internet.

In a distributed computing environment like the Internet, program modules may be physically located in different local and remote computers and memory storage devices. Execution of the program modules may occur locally in a stand-alone manner or remotely in a client/server manner. Examples of such distributed computing environments include local area networks (LAN) of an office, enterprise-wide area networks (WAN), and the global Internet. Accordingly, it will be understood that the terms computer, operating system, and application program generally include all types of computers and program modules designed for them. Specifically, it will be understood that each of the disclosed components of knowledge engine server 20, knowledge engine database 22, e-mail system 42, payment system 45, may be implemented as independent computer program modules running on a system constructed as described herein.

The discussion of methods, processes, agents, bots, and routines which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network. Those skilled in the art will recognize that such a communications network may be a local area network or may be a geographically dispersed wide area network, such as the Internet or an enterprise-wide computer network.

The processes and operations performed by the computer include the manipulation of signals by a CPU or remote server, e.g. an Internet web server comprising the knowledge engine server 20 or a user's computer 14, and the maintenance of these signals within data structures resident in one or more of the local or remote memory storage devices associated with such computers. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a "process" or method or "engine" or "agent" or "bot" is generally conceived to be a sequence of computer-executed or computer-implemented steps leading to a desired result, typically illustrated in the form of flow charts of program modules or routines. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, works, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, clicking, pressing, typing, entering, moving, positioning, placing, altering, etc. which are often associated with manual operations performed by a human operator. The operations described herein are machine operations performed in conjunction with various input provided by a human operator or user that interacts with the computer. Furthermore, the human operator input operations are often implemented by user interaction with various controls such as buttons, check boxes, radio buttons, hypertext links, text entry fields or boxes, and other user interface elements known to those skilled in the art. For example, it is well known in the art of present day computer user interfaces for a user to actuate a button or link by placing a cursor displayed on a display device by moving a positioning device such as a mouse or joystick and pressing or "clicking" a control button.

Although the disclosed best modes of the invention will be described in terms of procedural processes, methods, and routines, with respect various user controls such as buttons, check boxes, etc., it will be understood that the invention can be implemented with equivalent computer programming methodologies such as object-oriented programming, and alternative user input devices such as voice recognition of commands and text, gestural input devices, body position detection devices, and other similar computer input technologies now available and being developed for use in connection with networked (wireless or wired) computer systems.

In addition, it should be understood that the programs, processes, methods, routines, program modules, etc. described herein are not limited to any particular computer or apparatus, nor are they limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

With the foregoing overview of the illustrative operating environment, turn now to FIG. 2 for a discussion of various related processes 200 that implement the preferred embodiment of the invention. These processes are preferably carried out in the knowledge engine server 20, and pass information between them so as to carry out the objectives of the present invention.

Before a user may begin the process, it should be understood that the user may optionally be required to register and provide a means for payment by entering personal identification information as well as a means of notification. Once registered, the user receives an account and is assigned storage space on the server where the user's requests, results, and information may be collected. Once a user's account is set up, the user may enter one or more search requests and begin to conduct research in the manner described herein.

The preferred processes 200 for operating the knowledge engine 10 in accordance with the present invention shown in FIG. 2 generally include processes for carrying out the following eleven basic steps, which are not necessarily taken the listed order, and which may be combined in various subcombinations:

1. Enter a search request and select an expert topic;
2. Interact with the system to modify the search request to improve results;
3. From time to time, detect mistakes in search logic and syntax, and create new rules to assist users in modifying search requests and improve results.
4. Submit a finalized search request to the sources within the selected expert topic;
5. Collect and evaluate search results;
6. Communicate a context-sensitive summary to the user;
7. Analyze statistics generated by the search for potential new sources;
8. Rate and optimize sources;
9. Determine interface with new sources;
10. Establish a scheme for repeating the search at scheduled times to provide for a search update; and
11. Return to step 4. at an appropriate scheduled time for repeating the search.

Each of these steps will now be described in greater detail so as to facilitate the manner in which the present invention is made and used.

First, a user enters a search request via a web front end 202 to an input process 300 that analyzes the request. The input process 300 is shown and described in connection with FIG. 3. The search request is denoted in FIG. 2 as INPUT SEARCH REQUEST. Also, the user will typically make a selection of an expert topic, which selection is routed as an EXPERT TOPIC SELECTION to an expert topic database 210, and may also enter schedule information regarding the user's desire to receive scheduled updates to the entered search.

Second, the search is applied against an expert knowledge or rules database 218 to determine if the search can be improved prior to submission for searching. In the preferred embodiment, this step is effected by the input process 300 as a subprocess, although it will be understood that the search improvement can be a separate process. The search improvement process comprises an intelligent interactive syntax and search optimization process that processes the INPUT SEARCH REQUEST and gives recommendations to the user for formulating a better request. The recommendations may involve syntax, spelling, and/or recommendations on the use of search terms. These recommendations, shown as EXPERT SUGGESTIONS generally assist the user in optimizing the search and gaining better results. The search improvement process utilizes a rules database stored in an expert knowledge base 218, which is a component of the knowledge engine database 22.

Third, from time to time, a mistake detecting agent 400 is invoked to process searches to detect mistakes commonly made by users, and poor search results, with a view towards developing new rules for the expert knowledge base 218. The mistake detecting agent draws from the stored searches database 219, the stored search results database 213, the expert topics database 210, and the statistics database, and analyzes the contents to determine possible NEW RULES to add to the expert knowledge database. The mistake detecting agent 400 is shown and described in connection with FIG. 4.

Fourth, once a search request is formulated and any desired improvements are made to the search request, the finalized search request is routed as a SEARCH REQUEST to a submit and process engine 500. The submit and process engine 500 is shown and described in connection with FIG. 5. The search request is also stored in a stored searches database 219, for use in updating the search.

In the preferred embodiment of the present invention, the user selects an expert topic for the search from an expert topic database 210, a component of the knowledge engine database 22. The reader should appreciate, however, that an expert topic may be selected without user involvement based upon the submitted search terms. The expert topic database 210 provides information to the submit and process engine 500 as SELECTED EXPERT TOPICS. The submit and process engine 500 submits the request to a number of sources within the chosen expert topic in the appropriate syntax as required by each particular source.

The reader should appreciate that the syntax of the request that the user enters into input process 300 is independent of the actual syntax supported by the various sources contained in expert topic database 210. As will be further described below, because the knowledge engine has previously determined how to interface with each source, the user need not worry that different sources may implement their request syntaxes differently. In other words, the knowledge engine provides the user with a standardized process of requesting information from multiple sources having distinct interfaces.

Fifth, and still referring to FIG. 2, the next step in the process involves collecting and evaluating the results of the search request. The submit and process engine 500 submits one or more SEARCH QUERIES to selected sources identified in the selected expert topic, and receives RAW SEARCH RESULTS back from these queries. Stated in other words, the submit and process engine 500 gathers, collates, and stores the results or "hits" received from the various sources as a plurality of search listings or items, e.g. a first set of search results 50a (FIG. 1), which are raw and unprocessed (except for elimination of duplicate addresses). These search listings or items are stored in a stored search results database 213, a component of the knowledge engine database 22.

After this gathering and storage, each listing or item in the first set of search results (e.g. 50a) is then retrieved from the stored search results database 213 to determine whether it is active or outdated. In this manner, dead links are quickly determined and flagged. A dead link, or "link rot," is a listing that has moved or is no longer in operation. One skilled in the art will readily appreciate that an error message such as "404 error message" is commonly displayed when a particular site can not be located.

In addition to retrieving each located listing, the submit and process engine 500 also parses and reviews each listing. By "parsing", it is meant that the text in the item or listing is examined to locate the search terms, select a predetermined number of words surrounding the search term, and formulate a display item that includes the search term or terms in context with a predetermined number of words so that the user can evaluate the relevance of the hit. In this process, the submit and process engine 500 executes several functions, such as checking whether the actual content of each item is relevant. In the preferred embodiment of the present invention, relevancy is determined by searching the site using the search string provided by the user.

Based on evaluating the listings from each source, the submit and process engine 500 stores statistics on the number, relevancy, and quality of results from each source. Those statistics are then stored in a statistics database 217, also a component of the knowledge engine database 22.

Sixth, once the content relevancy processing is complete in process 500, a results and delivery engine 600 retrieves a selected set of search results (e.g. subset 60a in FIG. 1), and transmits a context sensitive summary of the results to the user. In the preferred embodiment of the present invention, results are transmitted to the user via electronic mail, via the e-mail system 42. Preferably, the selected subset for display 60a is also made available as DISPLAYED SEARCH RESULTS for online inspection and viewing at a web site accessible to the user, via the web front end 202. The reader should appreciate, however, that other methods of transmission, such as Internet sites, FTP, pagers, and cellular phones are available.

According to one aspect of the invention, the search results are displayed in a list ranked from the highest to the lowest rated sites. A 'site' being the grouping of individual pages at a specific high level Internet address or 'domain.' The listing of items or pages or "hits" associated with each site includes all the items that have been retrieved from that site. Therefore, the user may view all the items or pages from a particular site without having to jump erratically from site to site.

The results and delivery engine 600 is shown and described in connection with FIG. 6.

Seventh, a new source finder process 700 obtains the statistics generated by the submit and process engine 500 and analyzes the statistics for potential sites that may be usable as a new source. For example, a number of different search results containing a common item having reliable and relevant content may be tested to determine if that item may be used as a future source. As described above, a source must be capable of providing searchable indexed information. Those sites satisfying those prerequisites are then stored as NEW SOURCES in the expert topic database 210. The new source finder process is shown and described in connection with FIG. 7.

Eighth, a source optimization process 800 rates each source based on the reliability of search results that the source has provided in recent searches. In other words, the sources are rated based on factors including but not limited to the relevance, uniqueness, and quantity of usable item(s) retrieved for recent search requests. Any new or updated rating developed for each source is then formulated as SOURCE RATING information and stored in the expert topic database 210. The source optimization process is shown and described in connection with FIG. 8.

In the preferred embodiment of the present invention, the rating developed for each source is then ultimately used in prioritizing that source as used within any and all expert topics it is used in.

Ninth, an interface agent 900 determines the appropriate syntax required to interface with each of the potential NEW SOURCES stored by the new source finder 700 or manually input by an administrator or authorized user. More particularly, the interface agent 900 searches for the source search field and enters a number of model search requests (SOURCE PROBE) to probe or test the source. The results to each search request is then parsed and evaluated to ascertain the correct interface parameters. Information about the identity and manner of interfacing with any new sources is stored as SOURCE AND INTERFACE DEFINITION information in the expert topics database 210. The interface agent 900 is shown and described in connection with FIG. 9.

The reader should appreciate that, in the preferred embodiment of the present invention, existing sources may also be reevaluated to update possible syntax changes.

Tenth, a scheme is established for repeating the search for updating purposes in accordance with a predetermined schedule. This established scheme is handled by a scheduled dispatch engine 1000. The schedule can be set by the user in an earlier step (e.g. SCHEDULE INFO provided during the input process), or can be a default update schedule, e.g. once a day, once a week, etc., or can be customized by a schedule entered by the user via an appropriately constructed user interface. The schedule, whether predetermined or customized, is stored in association with the stored searches in the stored searches database by a scheduled dispatch engine. The scheduled dispatch engine 1000 is shown and described in connection with FIG. 10.

Eleventh, the scheduled dispatch engine 1000 repeats previously run search requests in order to update the previously obtained results, effectively repeating the above processes starting with the second step. Searches stored in the stored searches database 219 are retrieved in accordance with the predetermined schedule and submitted as a SCHEDULED UPDATE (one or more) to the submit and process engine 500. Because the user provided a notification means during the registration process, the results and delivery engine 600 will transmit the updated results to the user via the selected means. Moreover, because the results the user has already accumulated is stored and maintained, the knowledge engine can identify the listings that have been found during the updates and contact the user with the new information.

In the preferred embodiment of the present invention, the new listings are added to the previous list in an appropriate location, based on the source rating, and are highlighted. The highlighting is used to more easily direct the user to the new listings. In addition, when a user views the list, the user may select to only display the new listings.

With the foregoing overview of the various processes 200 in mind, turn next to FIGS. 3–10 for a more detailed discussion of the processes of the preferred knowledge engine 20 shown in FIG. 2.

Flow Charts of Preferred Computer-Implemented Processes

Input Process

Figure 3:
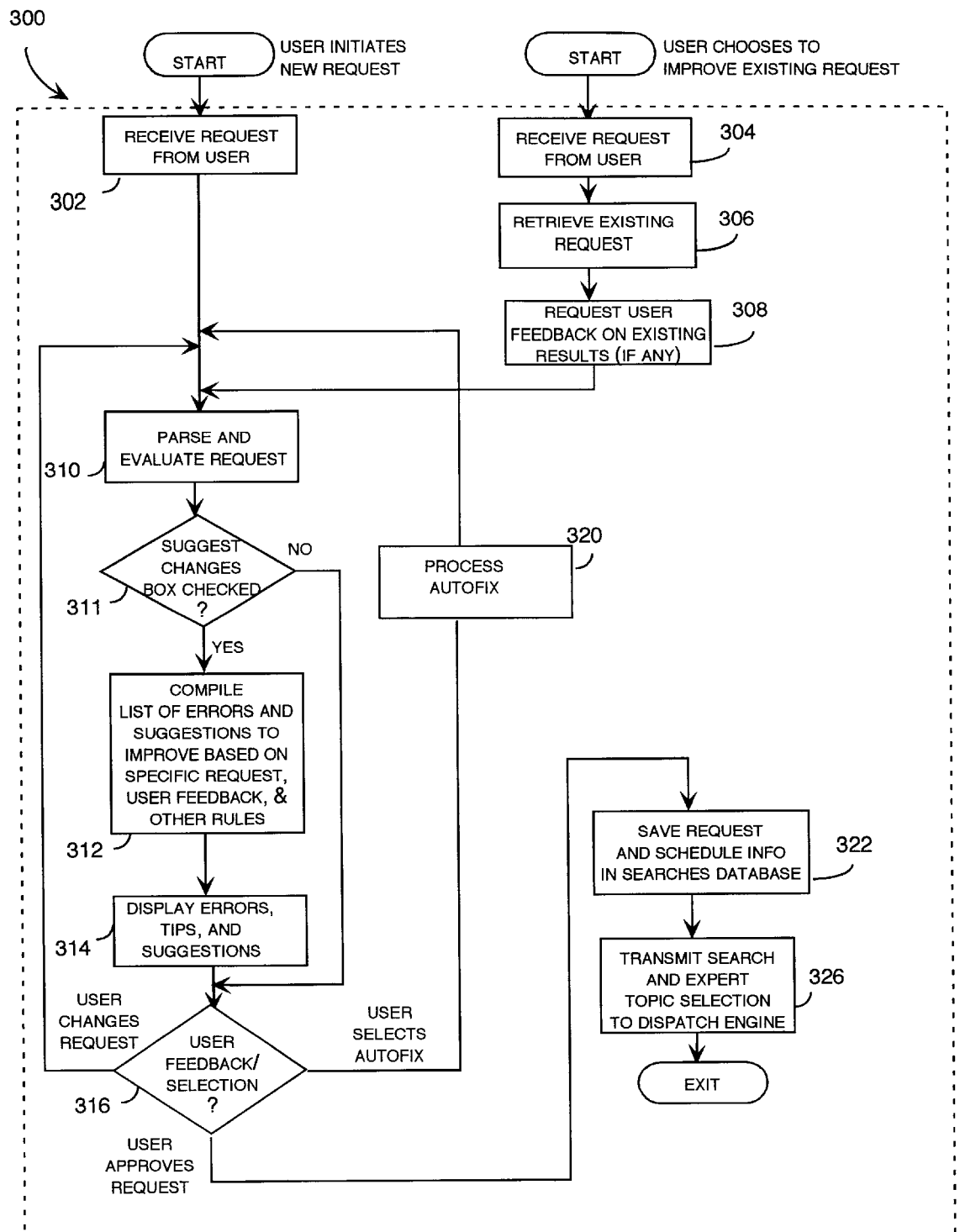
FIG. 3 is a flow chart diagram illustrating an input process constructed in accordance with the invention.

Turn next to FIG. 3 for a discussion of the input process 300. As shown in FIG. 2, a web front end 202 handles the interface between the user and the system 10. The preferred system 10 is Internet-accessible and operative on one or more hosted servers with high speed Internet access and large storage capacity, with a web front end that displays web pages for user interaction and receives user input. The construction and operation of a web front end is known to those skilled in the art and will not be discussed further herein.

For purposes of the following discussion, an exemplary search request soliciting information on the "2000 New Hampshire Primary" will be used to better explain the aspects of the present invention. More particularly, this example illustrates how the various components of the knowledge engine 20 operate to obtain and distribute the results of a typical user search request. The reader should appreciate that this exemplary search request is used only by way of example and should in no way be considered defining or limiting. For example, the exemplary search request may take the actual form of <(year 2000 New Hampshire Primary)>, where the symbols "<" and ">" are delimiters that are not entered by the user but are used in this discussion to set apart text enter by the user. It will be thus appreciated that text and symbols between the delimiters is entered by the user.

According to one aspect of the invention, a user may maintain a number of ongoing search requests. These search requests are stored in the system and displayed to the user in the form of "bookshelves," such as shown in FIG. 18. Thus, the user may not only enter a new search request but also modify or improve existing search requests to more narrowly or broadly define the desired information. The reader should appreciate that obtaining user feedback on previously received results, greatly increases the efficacy of search requests. For example, on reviewing the content received from the user's search request, the user may decide one or more new terms would be relevant, or alternatively, one or more old terms are irrelevant. Because search results are stored and maintained within a results database, the user will be able to fine tune search requests without receiving duplicate results.

Beginning at step 302 or 304 in FIG. 3, a search request may thus be received from two sources: a user may enter a new search request and start at 302, or a user may choose to improve an existing (e.g. prestored) request and start at 304. If a user enters a new search request, method 300 proceeds to step 310. If a user chooses to improve an existing search request, then at step 306 the search request is retrieved from storage, and at step 308 the user is requested to provide feedback on the search results (e.g. see FIG. 19). Control then passes to step 310 for either entry method.

At step 310, the search request is parsed and evaluated. For example, the individual terms may be separated, phrases may be grouped, punctuation marks and Boolean logical connectors may be examined, etc. In the exemplary <(year 2000 New Hampshire Primary)> search request, the words: year, 2000, New, Hampshire, and Primary will be recognized as terms. Because of the apparent ambiguity of the search request caused by the parentheses, the reader should appreciate that further refinement might be beneficial. Such refinement may optionally occur at step 312.

At decision 311, the inquiry is made whether the user has selected a "suggest improvements" check box (e.g. see FIG. 14) indicating a desire on the part of the user to receive feedback from the system that might improve the search results. If not, control passes to step 316. On the other hand, if the suggest improvements box is selected, control passes to step 312.

At step 312, the expert knowledge base 218 is referenced to analyze the parsed search request and compile any errors and/or suggestions to improve the user's search request. For example, in the exemplary search request, the expert knowledge base 218 may suggest eliminating the parentheses since <(year 2000 New Hampshire Primary)> is not likely the actual phrase the user is seeking. In addition, if the user entered <New AND Hampshire> the knowledge base 218 may suggest deleting the AND.

After compiling a list of errors and/or suggestions, those errors and/or suggestions, if any, are compiled. At step 314, the errors and suggestions are displayed to the user. In the preferred embodiment of the present invention, the user will also receive a clarification of how the request syntax they used was interpreted in addition to tips and explanations as to why the errors and suggestions were listed. Thus, the user gains a better understanding of the proper search request syntax that the user may apply to revising the current search request.

Once any errors and/or suggestions are displayed, the system stops for user input, via user feedback or selection. The user can provide several different inputs to alter or refine the search request. The user may alter the text of their search request based on their own ideas, seeing how their request syntax was interpreted, based on the suggestions provided, by selecting an "auto-fix" suggestion, or by altering other settings used to control the processing of the research request. "Auto-fix" refers to errors and/or suggestions provided to the user that can be fixed in an automated manner, such as replacing a word with a selected alternate spelling or removal of bad or incorrect syntax elements. The preferred implementation provides a "Fix It!" button next to such suggestions (see FIG. 15). Suggestions and/or errors that cannot be "auto-fixed" are ones which require the user to interpret the suggestion in context of their research objectives, such as adding/reducing the number of words in the request or converting some individual words into quoted phrases.

Once input is received, control passes to decision block 316, where a determination is made whether the user has altered the text of the search request, approved the request, or selected "auto-fix."

Thus, at decision 316, user feedback and selection is solicited (e.g. via a screen such as shown in FIG. 15, the user can select the TRY THIS button to have the modified search re-evaluated, or can select the GO button to initiate the search with the present search request). If at 316 the user changes their request, control passes back to step 310 for parsing and re-evaluation of the search.

If at 316 the user has selected the "autofix" option (e.g. the "Fix it!" button in FIG. 15), an autofix process 320 is carried out to automatically correct an error that may have been detected, e.g. to uncapitalize terms in the search request, or e.g. to change the spelling of "web cite" or "web sight" to "web site." If at 316 the use has approved the search request, control passes to step 322, where the search request is saved in the searches database, together with any schedule information that may have been entered by the user (e.g. see FIG. 21). At step 326 the search request and any entered expert topic selection (e.g. see FIG. 14) are transmitted to the scheduled dispatch engine 1000.

At an appropriate time, the search request will transmitted to the submit and process engine 500.

Mistake Detecting Agent

Figure 4:
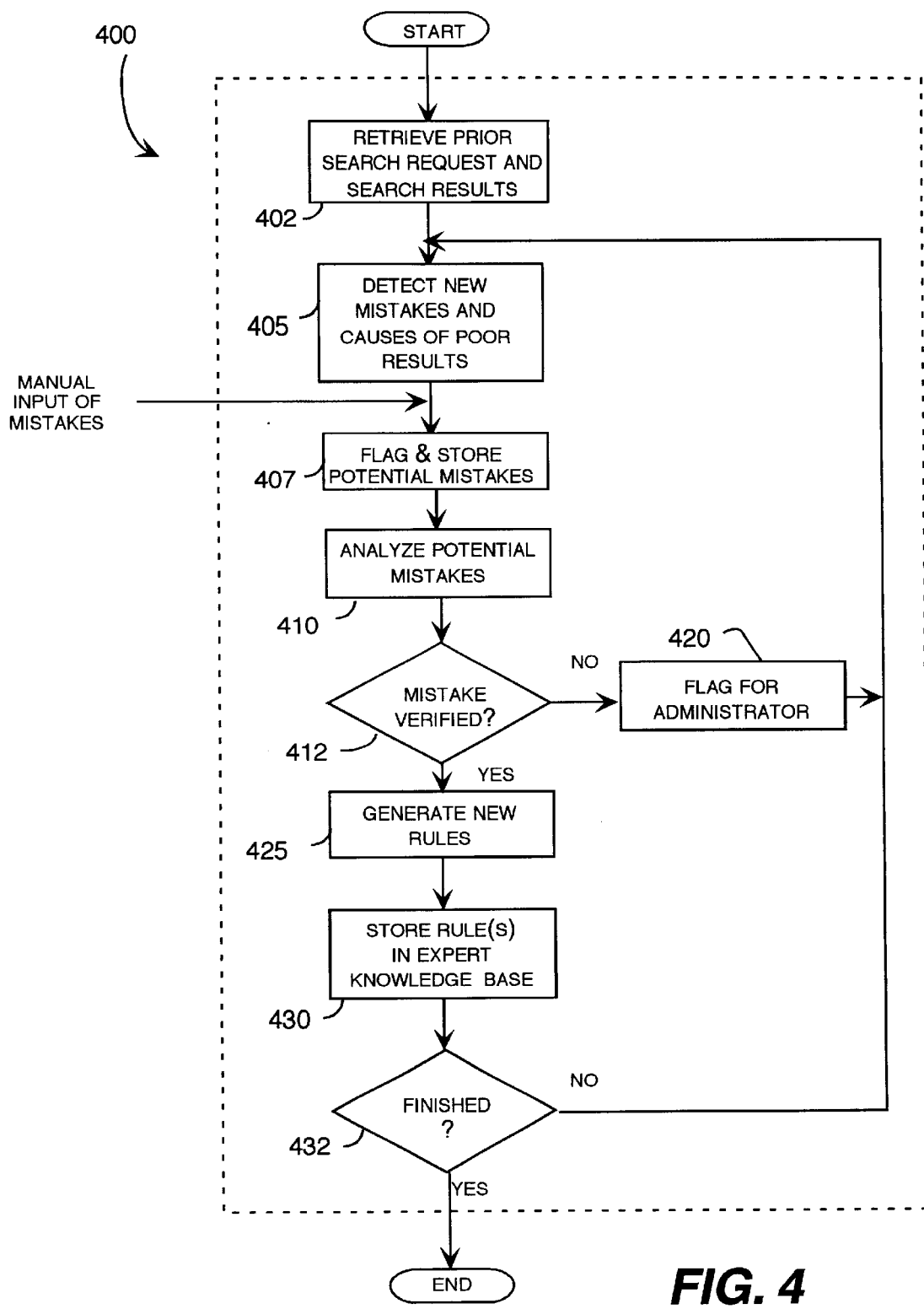
FIG. 4 is a flow chart diagram illustrating a mistake detecting agent or process constructed in accordance with the invention.

FIG. 4 illustrates mistake detecting agent 400 which is effected from time to time to detect commonly occurring mistakes that may not be reflected in the expert knowledge base 218, create new rules, and add these new rules to the expert knowledge base 218. Although the process 400 is designated as an "agent," it will be understood that a process is generally involved. Preferably, the agent 400 is constructed to run periodically or under certain conditions, e.g. when traffic or usage of the system is slow.

Upon invocation, the agent or process 400 begins at step 402, where any prior search requests and corresponding search results are retrieved from the stored searches database 219 and stored search results database 213, respectively. Mistakes are often indicated by the production of very few search results. At step 405, any new mistakes or other causes of the few search results are detected. As an example, "poor" search results may be indicated if a particular prior executed search returned fewer than a predetermined number of items, e.g. fewer than five items. Of course, the topic searched could be obscure and generate few results, but it is also possible that the search request was flawed in some way.

At step 407, any potential mistakes are flagged in the database and at step 410 the potential mistakes are analyzed. The step of analyzing the mistakes can entail comparison of a frequently occurring but improper search term against a prestored dictionary. For example, if a large number of users began entering the search term "web cite" instead of "web site", and no rule existed yet on this error, a high frequency of occurrence of this entry error should perhaps result in creation of a new rule.

At decision 412, the inquiry is made whether a mistake can be verified. A mistake cannot be verified if it has a low frequency of occurrence or the method of correction (rule generation) requires human interpretation. Thus, at step 420 a low frequency of occurrence potential mistake is flagged for a system administrator to review, as the mistake still be serious enough to warrant manual creation and entry of a rule.

If at 412 a mistake is verified by having a high frequency of occurrence, i.e. a sufficiently large number of users are repeatedly making the same mistake, a new rule should be created. At step 425 a new rule is then created, and at step 430 the new rule is stored in the expert knowledge database 218. For the purpose of this discussion, rules comprise both error protocols and suggestions. For example, in the capitalization illustration above, an error protocol may be generated for searching for capitalized terms. In addition, a suggestion may be associated with the error protocol that describes the purpose of the error and teaches the user how to submit improved search requests.

At decision 432 the inquiry is made whether the retrieved prior searches and results contain any other potential new mistakes and should be analyzed further. If not, the process branches back to step 405. If analysis of mistakes is complete, the process 400 exits.

Submit and Process Engine

Referring now to FIG. 5, the submit and process engine 500 for submitting and processing a search request will be described. The submit and process engine 500 comprises three related subprocesses: a submit & process supervisor, a submit engine 530 and a process engine 540.

Starting in FIG. 5A, the engine 500 begins when the dispatcher (i.e. scheduled dispatch engine 1000 in FIG. 2) requests processing for one or more stored requests, e.g. request #NNN. Starting at step 502, the first step taken is to select one or more sources from the appropriate preselected expert topic associated with the stored search request or requests. At step 504, the request is then submitted to the submit engine 530. The submit engine 530 is independently operative to submit the request(s) to one or more specified sources, 1, 2, . . . N as will be described.

Next, at step 507 the supervisor retrieves any pre-existing (pre-stored) search results associated with the particular search being handled, and submit them to the process engine 540 for re-evaluation. Re-evaluation helps determine if any pages or information found in a prior search have changed or become dead links.

Still referring to FIG. 5A, when the submit engine has received a response (and hopefully raw search results) from a source, control is passed to decision 510, where the inquiry is made whether there are any results to process. If so, the results are passed to the process engine 540 for processing. If not, then at decision 512 the inquiry is made whether all N sources have responded. If not, the system loops in waiting for all N sources to respond (or time out). After all N sources have responded or timed-out, at step 515 the inquiry is made whether the searches to the various N sources have resulted in insufficient usable results, but there are still other sources that can be contacted. In accordance with an aspect of the invention, not all possible sources associated with a selected expert topic are searched at the same time. Certain sources, typically lesser quality sources, can be delayed in searching to see if the higher quality searches have produced adequate search results.

If at 515 not all sources have been contacted and there are insufficient results, control passes back to step 502 to contact other (and possibly lower quality rated) sources. On the other hand, if a sufficient number of usable search results have been generated, then control passes to step 520, where the results are stored and transmitted to the results and delivery engine 600 (FIG. 6). Then, at step 522, the schedule information associated with the particular search request is updated, e.g. set to a later time, so as to re-queue the search for updating again at a later time. The submit and process engine 500 is now finished with searching and processing, and terminates.

Figure 5B:
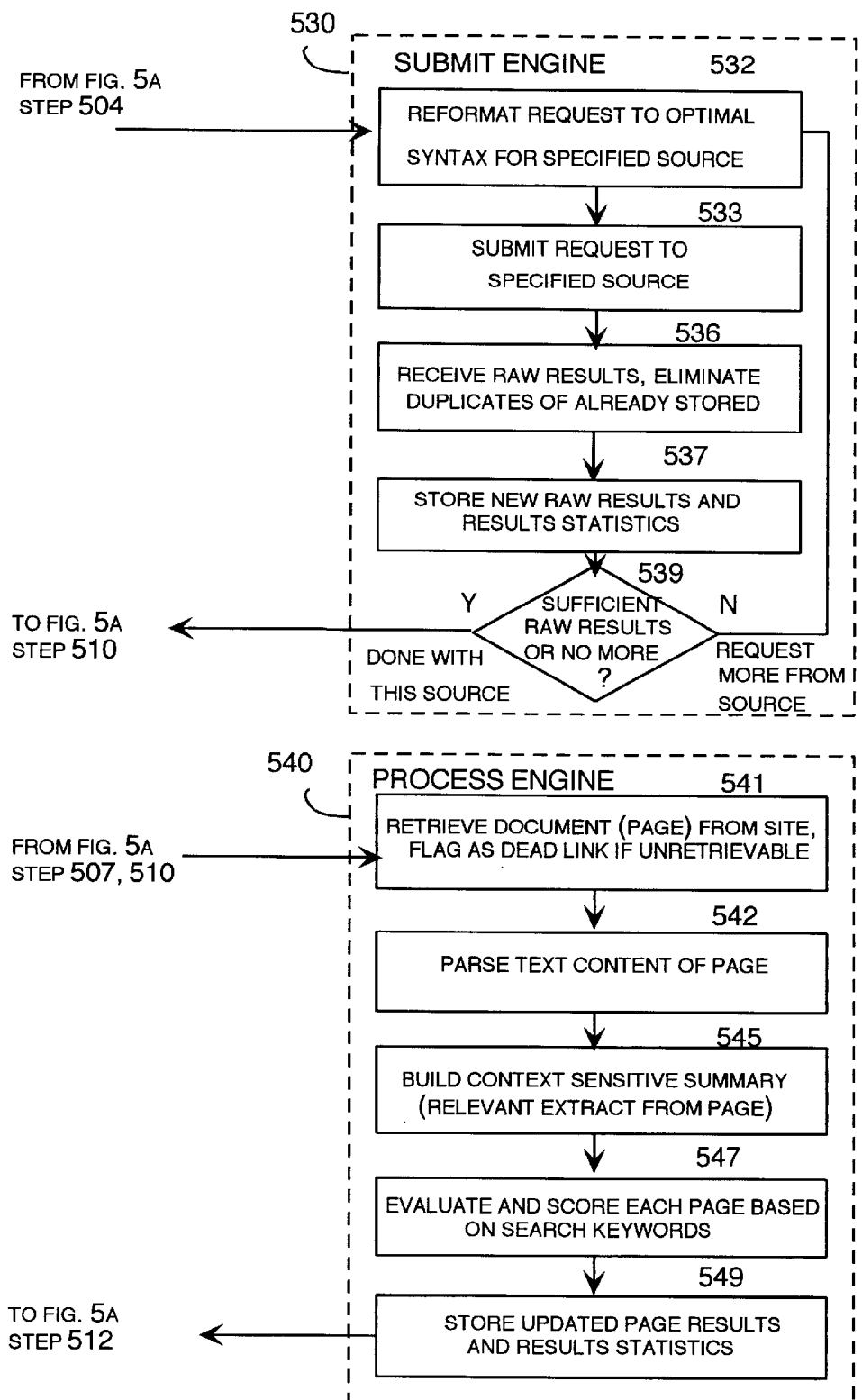
FIG. 5, consisting of FIG. 5A and FIG. 5B, is a flow chart diagram illustrating a submit and process engine constructed in accordance with the invention.

Referring next to FIG. 5B, the submit engine 530 begins when it is passed a request intended typically for submission to a particular source. Those skilled in the art will understand that particular sources may be search engines maintained by third parties, or may be web pages with search boxes, or may be catalogs or indexes such as YAHOO!™. Each of these sources requires a particular search input syntax in order to conduct a proper search without returning error messages or inadequate results. The search input syntax required for a source is stored, e.g. in the expert topics database 210, in association with information identifying the source, e.g. the URL of the source.

At step 532, the search request is re-formatted to adopt the optimal syntax for the specified source. This is effected by storing source profile information including search syntax information in association with source identification information in a database, e.g. the expert topics database 210 or alternatively in a separate sources information database (not shown) or other database.

At step 533 the syntactically properly formatted search request is submitted to the specified source, typically via an http request. At step 536, assuming the source responds, raw search results are received. Any duplicates to any prestored search results for that specific request are preferably discarded. At step 537, the new raw results are stored. Statistics corresponding to the search are generated, e.g. how many findings or "hits" were obtained from this source, and the statistics stored in the statistics database 217.

At inquiry 539, the number of raw results is tested to determine if a sufficient number have been generated, e.g. fewer than a predetermined number of search result items or "hits." If too few results have been generated, control passes back to step 532 and more items from the selected source are obtained. If at 539 there are sufficient results from the selected source, or if no more results are forthcoming from the particular source, control passes from the submit engine back to the supervisor. In the preferred embodiment, the settings for number of results desired from each source and for the research update as a whole can be used to control the amount of effort expended ("search depth") to research the given request. This is important given that the higher amounts of effort expended researching usually experience diminishing levels of return. As such, the "depth" can be adjusted by either the user or internal processes to generate a preferable balance between efficiency and thoroughness.

The process engine 540 begins when it is passed any pre-existing or pre-stored search results from step 507 in the supervisor, or when results received from the submit engine are passed to it via step 510 in the supervisor. These results are typically in the form of hyperlinks or URLs. Starting at step 541, the process engine first retrieves a document (e.g. a web page from a web site). If the page is unretrievable, e.g. "Error 404" is returned, the link pointing to the particular page in the source is flagged as a dead link. Preferably, the link may be discarded from the search results set.

At step 542, the text of a search result item is parsed. At step 545, a context sensitive summary is constructed, i.e. a predetermined number of words before and after the search terms in the search results are obtained. In other words, the process engine extracts and annotates (i.e., highlights) the portions of the listings that have the highest statistical likelihood of relevance to the search terms for display to the user.

At step 547, each page is scored based on the search keywords to determine a relevance indicator. According to an aspect of the invention, relevance is determined by searching the site using the search string provided by the user and not relying upon metatags. By this direct searching, this processing eliminates metatag distractions in the search results as well as outdated indexing at the sources. As will be understood by those skilled in the art, "metatags" are HTML tags that generally identify the contents of an Internet site. More particularly, metatags contain such things as general descriptions of the sites and keywords for search engines. Often metatags contain misleading terms that are wholly unrelated to the actual site content. Thus, opening each listing and determining content relevance eliminates misleading metatags and outdated indexing.

According to an aspect of the invention, as part of the analysis and the internal reapplication of the search string, the process engine 540 can eliminate results found by sources that do not support certain syntax (e.g., Boolean logical connectors). For example, if a user submits a search for "2000 AND (New Hampshire) AND Primary" to a source that does not support the logical "AND" connector, it will return results including "2000" and/or "New Hampshire" and/or "Primary". Thus, many found items may contain only one or two of those terms. By reapplying the search criteria, however, the process engine can rule out result items that do not match the full context or precision that the user requested. This allows effective use of sources that do not fully comply with the preferred syntax and features common to many such sources.

Finally, at step 549 any updated page results are stored in the search results database 213 and any associated statistics are stored in the statistics database 217. Based on evaluating the items from each source, the process engine processes and generates statistics on the number of items from each source and the relevance of each of those items. Control is then returned to the submit & process supervisor.

The reader should appreciate that the context sensitive summary is of important value. For example, even if two items come from different sources, a user can often easily discern that the items' content is identical because the context sensitive summaries are the same for both listings. Unlike prior art search engines, which by design can only provide preselected summaries, this invention provides an extract highly relevant to the requester to allow "visual skimming," or quick visual review of result references cited without having to retrieve the entire reference to determine its applicability to the user's objectives.

Accordingly, the preferred knowledge engine, unlike existing search engines that provide every item that is indexed in the search engine's database, provides the user with a kind of "quality skimming" (i.e., the knowledge engine provides a user with only the most relevant items found in the various sources). The knowledge engine handles the information in this manner for two reasons. First, if the knowledge engine provided the user with everything that is available the first time, an update would be meaningless. Second, a small group of relevant listings provides a user with a manageable flow of information at one time. For example, the user may conduct an initial search and receive 20 to 50 listings. Over a subsequent period, the user may receive another 8, 10, or 15 listings in scheduled updates. Thus, the user is provided with manageable portions of information for his or her review. The number of listings provided in the initial set and in subsequent updates is, of course, selectable by the user.

In accordance with the preferred embodiment of the present invention, in addition to the context sensitive summary, the item listings will preferably also include a verified date. That date indicates when the knowledge engine retrieved and checked the item, and generated the context sensitive summary. The user knows that, as of this date, the knowledge engine has verified the item. Meaning that, the knowledge engine verified the site was available and the item was relevant to the request.

Results and Delivery Engine

Figure 6:
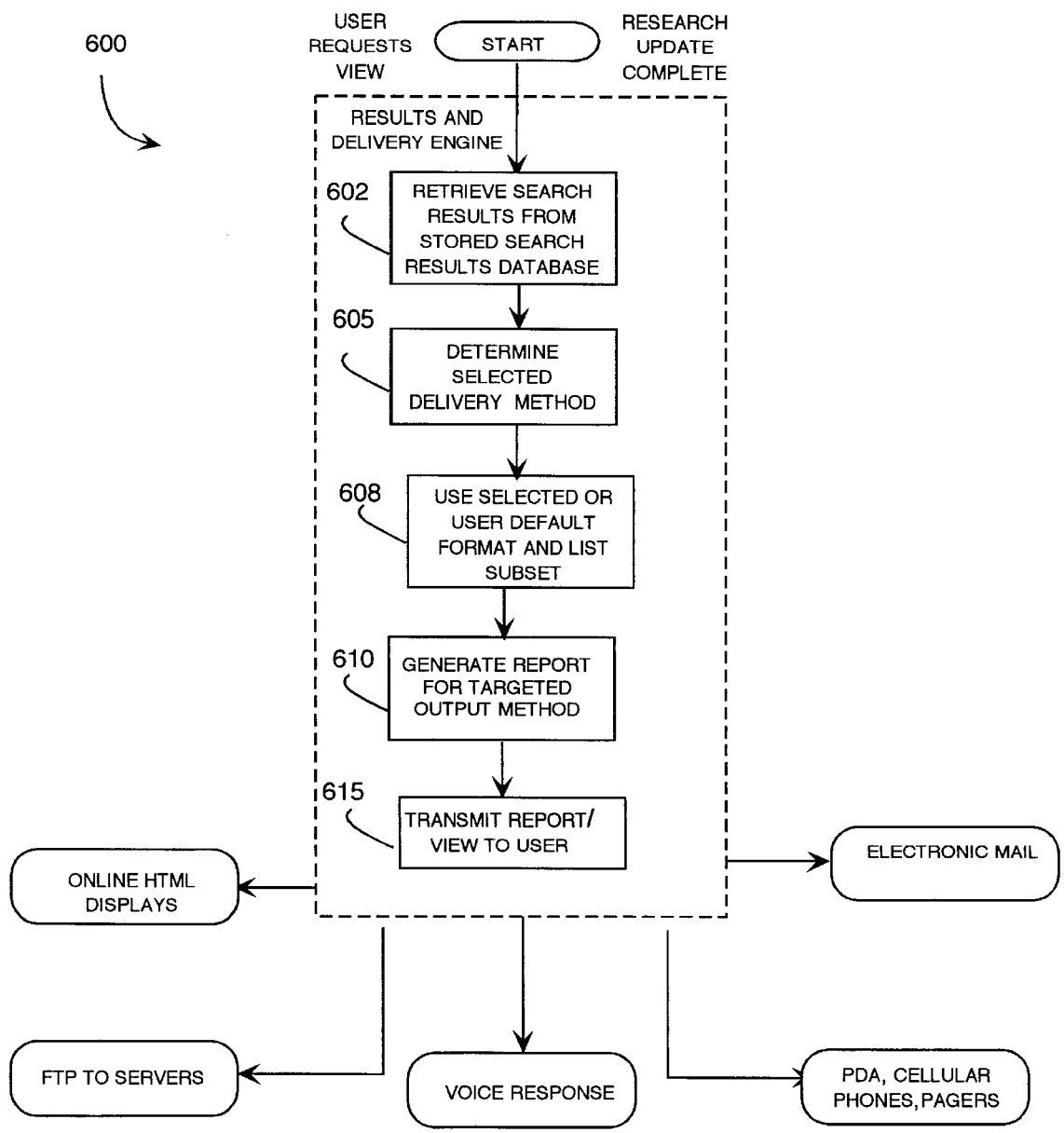
FIG. 6 is a flow chart diagram illustrating a results delivery engine constructed in accordance with the invention.

Refer now to FIG. 6 for a discussion of the results and delivery engine 600, which is operative for retrieving search results processed by the submit and process engine 500, as stored in the stored search results database 213, and communicating corresponding lists of results to the user. The results and delivery engine can be invoked in at least three manners: first, when a user requests to view their search and selects a search from their "bookshelf" (see FIG. 18), second when a schedule search or updated search completes its execution, or third when a user requests the results to be transmitted by e-mail or other comparable means to a desired recipient.

Starting at step 602, the first step taken is to retrieve the search results for a particular search from the stored searches database 213. At step 605, a selected delivery method is determined. For example, the user may have selected to have search results displayed or viewed only via a web browser via online HTML display, via e-mail, via FTP to a user's remote computer, via display to a personal digital assistant (PDA) or personal information manager (PIM) or cellular phone or page, or via voice response delivery. The appropriate delivery method is determined, so as to establish a format for delivery of the information.

At step 608 the system uses a selected delivery method or a user default method, and selects a subset of N search items for delivery to the user. The subset may be selected based on various combinations of attributes including but not limited to relevance, newness, recent change status, or manual selections. See FIGS. 11 and 12 for an example of selection of a selected set or subset of search items for communication to a user.

At step 610, the selected N items are then formatted appropriately for the selected delivery method, e.g. by creating a report format for the selected delivery method. Then at step 615 the report or view of the information is delivered to the user.

It will be appreciated at this point that, in the preferred embodiment, the information from various sites is typically selected for display in site relevance order. That is, the results are grouped by the sites they reside at, which are then ranked in relevance order, and information from those sites deemed to be of highest relevance is delivered prior to information from sources deemed to be of lower quality.

New Source Finder

Figure 7:
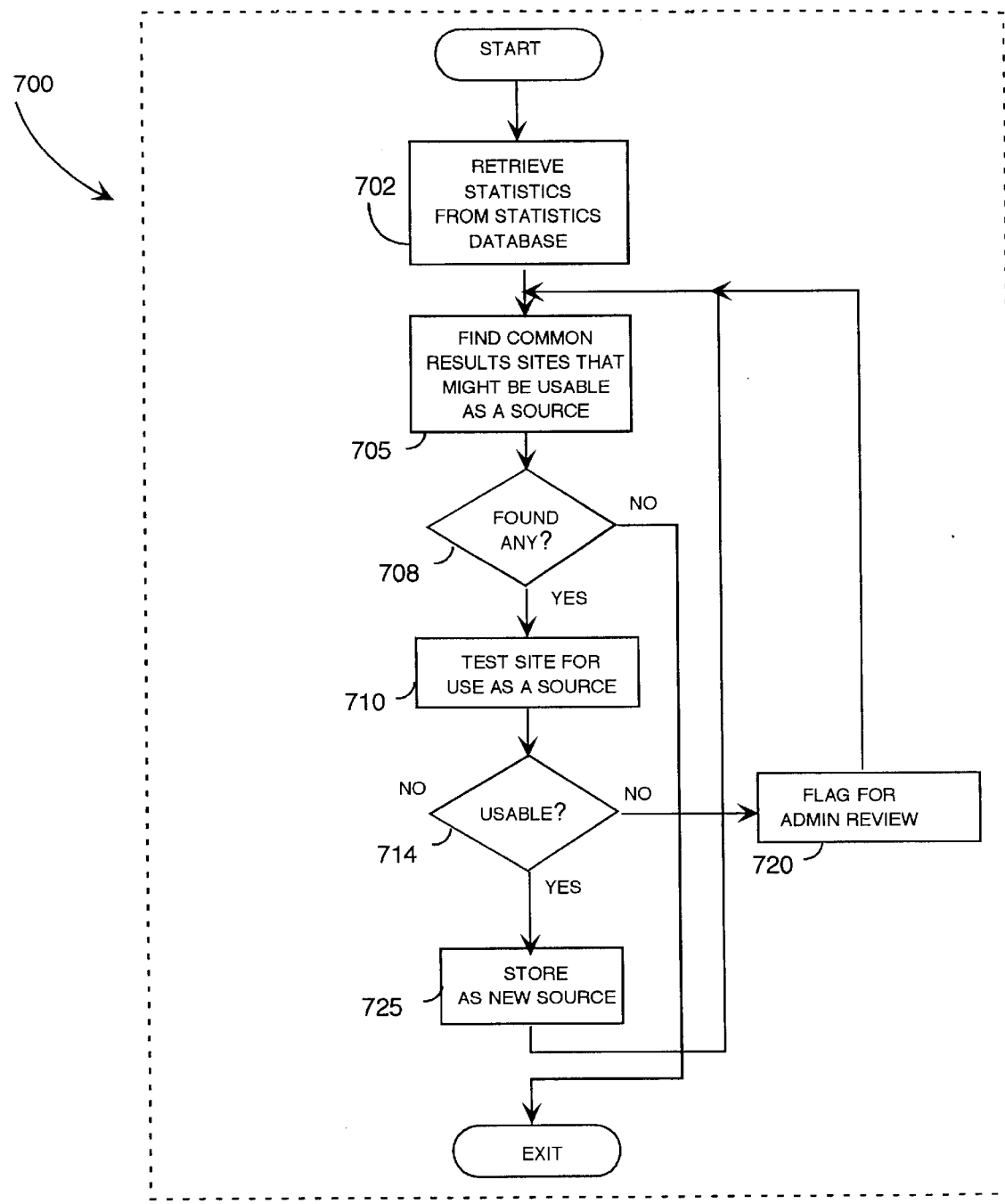
FIG. 7 is a flow chart diagram illustrating a new source finder process constructed in accordance with the invention.

Refer now to FIG. 7 for a discussion of the new source finder process 700 constructed in accordance with the preferred embodiment of the present invention. The new source finder is operative periodically or upon other condition to process statistics stored in the statistics database and find sites that might be suitable for inclusion as a source within an expert topic. The new source finder employs statistics stored in the statistics database 217 to identify potential new sources based on analysis of particular Internet sites occurring frequently in results of search requests matching specific keywords, expert topics, or other identifiable patterns. Any results in common to plural sources meeting administrator set minimum criteria are indicated and stored as potential new sources.

The new source finder 700 begins at step 702, where statistics stored in the statistics database 217 by the submit and process engine 500 are retrieved. These statistics lead to potential new sources; For example, if a particular web site produced a number of search result items or listings larger than a predetermined number, that site might be suitable for inclusion as a source. Continuing the example, if a new medically-oriented information index appeared on the Internet, and produced 300 results in response to a search, but that site is not listed as a source in the stored expert topic sources, that site might be suitable for inclusion within the medical expert topic.

At step 705, any sites that produced a large number of listings are obtained from the retrieved statistics. At decision 708, the inquiry is made whether the stored statistics included any large number of listings and might indicate a potential new source. If not, the process exits. However, if so, control passes to step 710, where a web site is tested as a possible source. The test may be manual or automated. A preferred way of testing a site for use as a source is to pass the site a plurality of exemplary search requests that are specific to a particular expert topics, e.g. oncology, and determining whether the site returns a sufficient number of results. Several test requests are preferably run to establish the suitability and/or usability of the site, e.g. a site might not be usable if it is a private database with user logon and password, or if the site uses an unusual syntax.

At decision 714, the inquiry is made whether the site is usable as a source. Preferably, a source must be capable of providing searchable indexed information. Thus, in the preferred embodiment of the present invention, a potential new source may be examined for the presence of a search field as an indication that the source is searchable. For the purposes of this discussion, a search field is any field that provides content queriable functionality. If the site is not usable as a source, the site may be flagged at step 720 for administrator review. If the site appears usable, i.e. it produces reliable and repeatable results, in a sufficient number, for a plurality of test requests, the site is stored as a new source in the expert topics database 210 and the new source finder exits.

According to an aspect of the invention, both primary and secondary sites of items having reliable and relevant content that is repeatedly generated in a number of different search results may be considered as future sources. For the purposes of this discussion, a "primary" site is a site that provides indexed information and/or additional indexed sites; a "secondary" site comprises an separately indexed site of a primary site. For example, CNN.COM may be considered a primary site, while CNN.COM/WORLD/ may be considered a secondary site (provided that the site separately indexes its content).

The reader should appreciate that non-indexed, non-searchable items such as documents may also offer valuable content. While those items are generally indexed by one or more sources contained in the expert topic database 210, others may not. Thus in the preferred embodiment of the present invention, those sites may be cumulatively indexed and maintained by the knowledge engine and used an additional source.

Source Optimization Process

Figure 8:
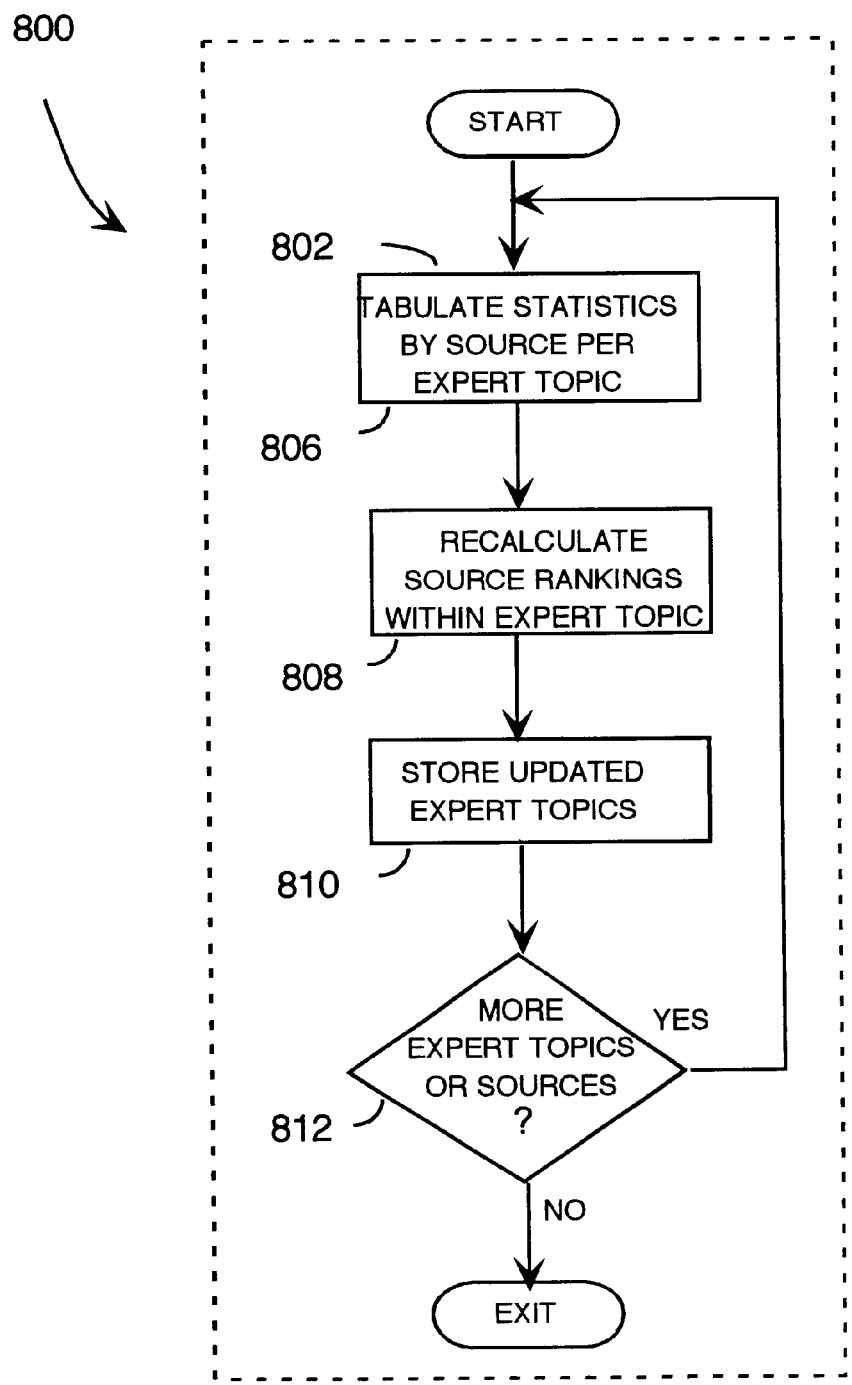
FIG. 8 is a flow chart diagram illustrating a source optimization process constructed in accordance with the invention.

Turn now to FIG. 8 for a discussion of the source optimization process 800 constructed in accordance with an aspect of the present invention. The source optimization process examines recent performance of sources used within each expert topic and as a whole. The analysis is used to re-optimize the priorities at which each source is applied toward researching within a particular expert topic. As someone proficient in this field would know, the nature, content, quality, and interface specifications for these sources often change over time. Some improve, some deteriorate, some go through minor to major changes in their interface or syntax or output formats. The source improvement process allows the described system to constantly adapt to these changes by monitoring the success of interaction with the sources and reprioritizing its use of each source for an optimal mix of broad content coverage and efficient use of sources to achieve the desired quantity of results for each update. This allows the good sources (defined by those the described processes have the greatest success obtaining valid and unique results from) to rise to the top of the queue, while less successful sources sink toward the bottom.

In the disclosed embodiment according to this aspect of the invention, each source in the expert topics database is linked to statistics representing the number of items retrieved for any given search as well as the cumulative relevance/irrelevance of those items. The source optimization agent 800 periodically analyzes these statistics to determine updated rankings. For example, a source producing a large number of items for a particular search request may be given an elevated indicator. That indicator, however, will be substantially lowered if most of those items emerge as link rot, irrelevant, or the like.

According to an aspect of the invention, the source optimization process is operative to rank the quality of a source, and store a rating of the source in association with the source address in the expert topics database 210. In the disclosed embodiment according to this aspect of the invention, each source is flagged in the expert topics database with an indicator representing the number of items retrieved for any given search as well as the cumulative relevance/irrelevance of those items. For example, a source producing a large number of items for a particular search request may be given an elevated indicator. That indicator, however, will be substantially lowered if most of those items emerge as link rot, irrelevant, or the like.

The reader should appreciate that a source may have a distinct indicator for each expert topic group that considers it a source.

Starting in FIG. 8 at step 802, statistics are retrieved from the statistics database and tabulated by source per expert topic. Stated in other words, the source rankings are recalculated based upon the addition of the new statistical indicators. Within each expert topic, each source is ranked, or numbered, based on the reliability of prior search results that the source has provided in past searches. For example, for any given expert topic, a source consistently generating the most relevant items may be ranked number one, a source generating the second most relevant items may be ranked number two, and so on.

At step 808, those rankings are recalculated based upon the new statistical information tabulated in step 806. The reader should appreciate that, while this process of ranking sources is described using indicators and recalculating rankings based on new statistical indicators, that description is used only as one possible implementation of the present process. Those skilled in the art will appreciate that other well known means of ranking based on the reliability of prior and present search results may be used.

From step 808, method 800 proceeds to step 810, where for each expert topic any new or updated ranking developed for each source is stored in the expert topic database 210.

At decision 812, the inquiry is made whether there are more new sources and/or expert topics to be evaluated and re-ranked. If so, control passes back to step 802, and the next expert topic is reevaluated and the sources therein ranked according to the current statistic. If no further expert topics remain for reevaluation, the source optimization process ends.

Interface Agent

Figure 9:
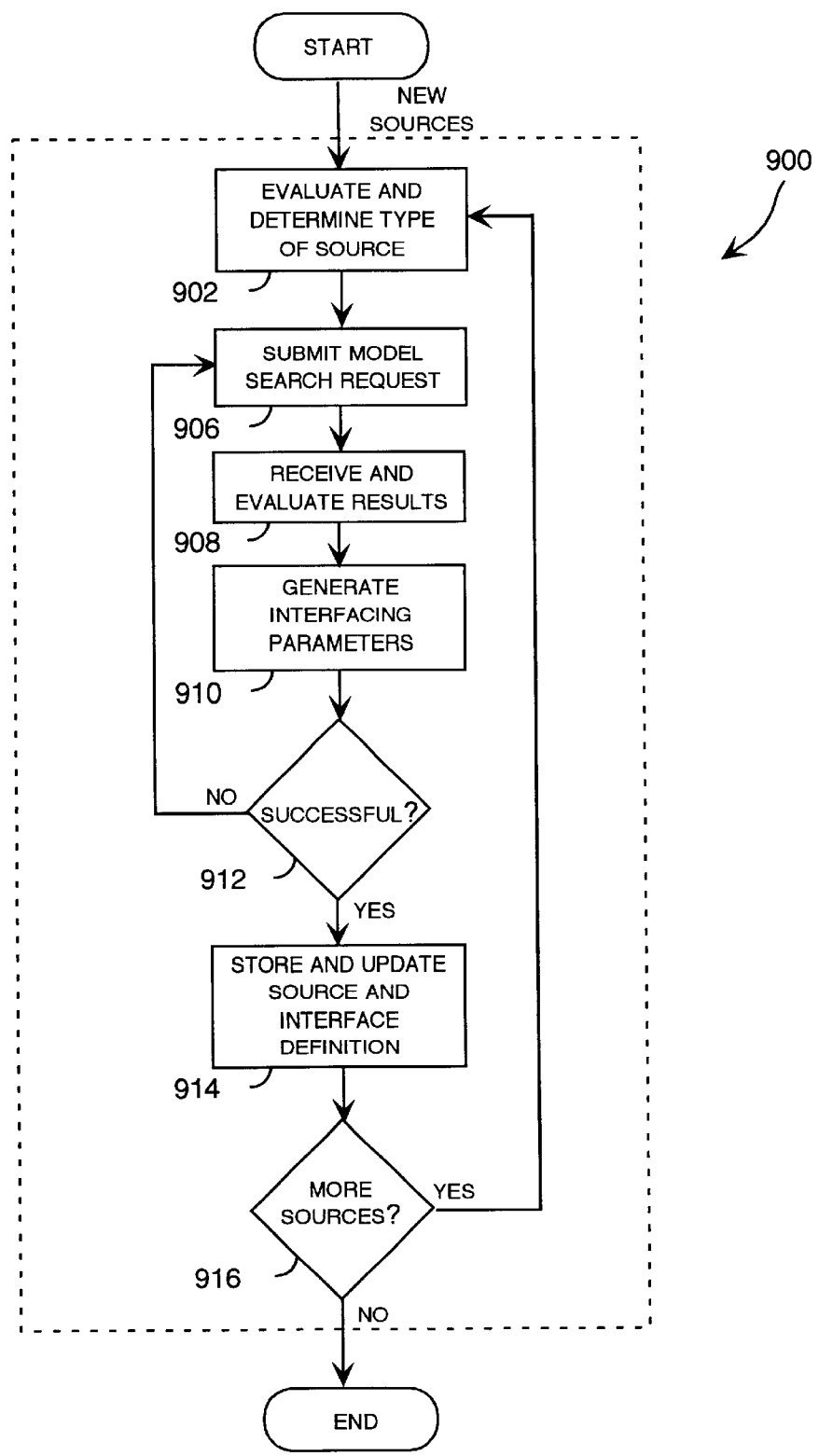
FIG. 9 is a flow chart diagram illustrating an interface agent or process constructed in accordance with the invention.

Referring now to FIG. 9, the interface agent 900 will be described. The interface agent is operative for determining how to communicate with a particular source, also for probing or testing a potential new source. As someone proficient in this field would know, the nature, content, quality, and interface specifications for these sources often change over time—sometimes going through minor to major changes in their interface or syntax or output formats. Preferably, this agent will be invoked regularly to validate or update the interface specifications for already known sources.

The interface agent or process 900 begins at step 902, where, based on its content, a known source (any potential NEW SOURCE or one already validated for use) is evaluated (or re-evaluated) to determine its type, e.g. whether the source is dynamic, static, or of other category. As previously stated, a dynamic source comprises a source whose index is updated, while a static source comprises a source that is never or rarely updated. The reader should appreciate that a distinction is made between dynamic and static sources because dynamic sources, for example a news source which can change on a daily basis, should be revisited in future update searches for any updated information. Although static pages can change, they are less likely to change as frequently as dynamic pages and may be revisited or re-searched less often.

From step 902, method 900 proceeds to step 906, where a model search request or source probe is submitted to the source. In the preferred embodiment of the present invention, a model search request or probe includes a plurality of different searches utilizing various different syntax, such as Boolean connectors, capitalization, punctuation, special symbols typically recognized by search engines, etc. At step 908, the results from the model search or probe are received and evaluated. The evaluation process determines which syntax included in the model search request were effectuated. For example, if, in response to a search request <A AND B>, the source produced an item containing only term "A," then it may be surmised that the new potential source does not support the logical Boolean operator "AND".

Once the results have been evaluated, method 900 proceeds to step 910, where an appropriate s et of interfacing parameters are generated based on the evaluation at step 908. For example, if a source does not support the Boolean term AND, an interface definition for this particular site may be created that refrains from submitting a Boolean AND operator when searching the site. On the other hand, if the source supports Boolean AND operators, the interface definition will preferably indicate that such operators are supported.

From step 910, method 900 then proceeds to decision block 912, where a determination is made whether the correct interfacing parameters have been determined, resulting in a successful probe of the interface. In the preferred embodiment of the present invention, whether the interfacing parameters have been correctly determined requires an iterative search request sequence. The number of search requests needed to verify the interfacing parameters will be predetermined based on the various syntax variations that will be supported.

Thus, at step 912, if it is determined that the interfacing parameters have been successfully generated, then method 900 continues to step 914, where the source's interface definition is stored or updated in the expert topic database 210 as SOURCE AND INTERFACE DEFINITION INFORMATION. This information is used by the submit and process engine when conducting a search.

If, however, it is determined that the interfacing parameters have not been successfully generated or verified, then method 900 returns to step 906, where a new model search request is submitted to the new potential source to further test and probe the source. Should the predetermined list of model searches be exhausted before the interface to the source is verified, then the source is flagged as unusable pending human review.

Note that this process will update definitions used for active sources as well as create the definitions for new sources. In the preferred embodiment, this process is invoked on a frequent basis to ensure that the interface definitions of sources in use are sufficiently up to date. Frequent application of this process ensures that sources that change are either automatically updated or flagged for attention with minimal disruption to the operation of the system.

From step 914, method 900 continues to decision block 916, where it is determined whether any other sources need to be evaluated. If so, method 900 returns to step 902. If no other sources need evaluation then method 900 ends.

Scheduled Dispatch Engine

Figure 10:
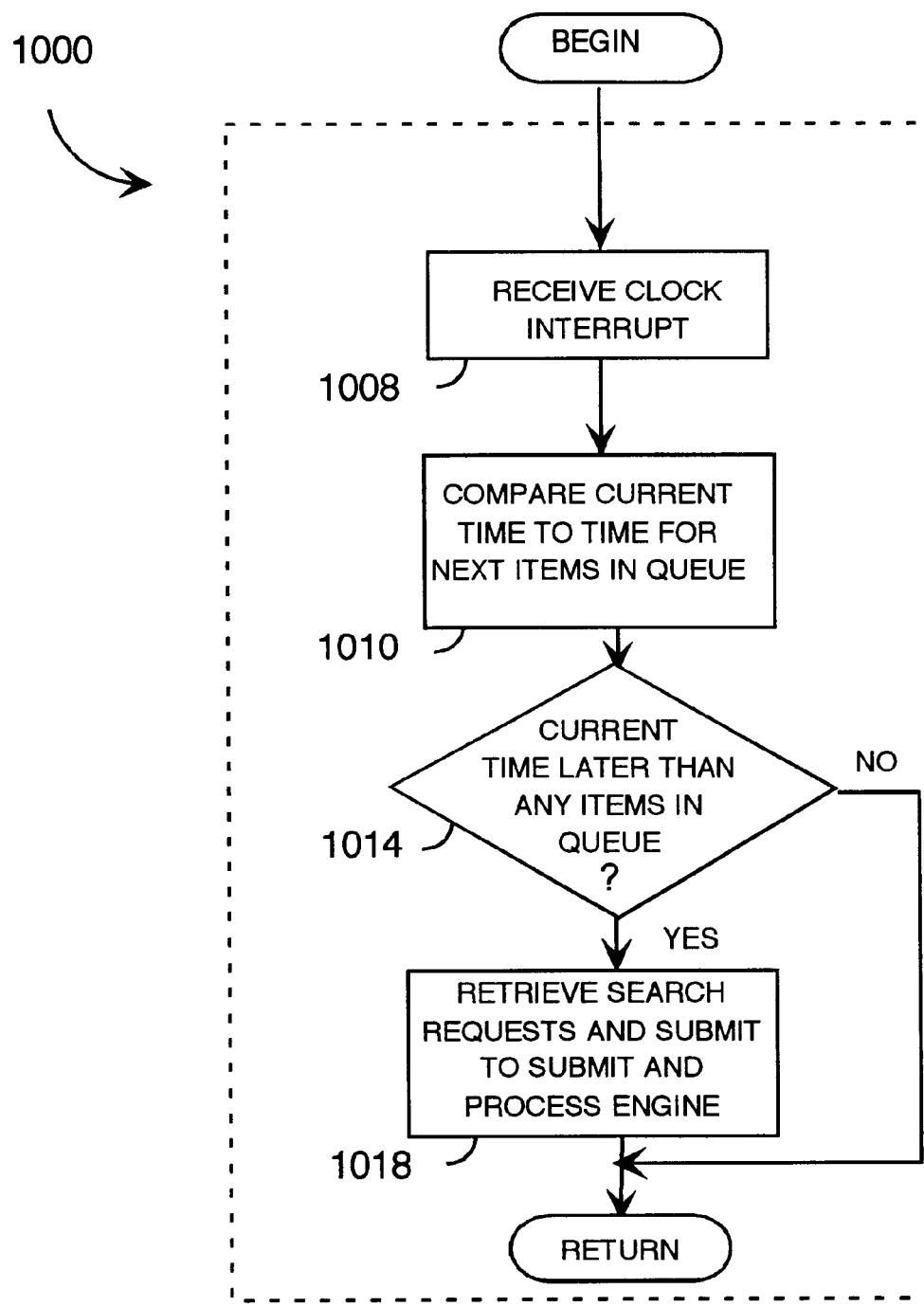
FIG. 10 is a flow chart diagram illustrating a scheduled dispatch engine or process constructed in accordance with the invention.

Referring now to FIG. 10, the scheduled dispatch engine 1000 will be described. This engine is operative for scheduling updated searches in accordance with schedule information stored in the stored searches database 219. Schedule information is typically input from the user via the input process of FIG. 3 (e.g. see FIG. 21 for a page that allows input of user notification options in the form of a frequency of search updating). For example, the user may choose to receive updated search results periodically in daily, weekly, or monthly increments. The reader should appreciate that the user may enter the scheduling input during the initial search request or after receiving the initial search results, or may change the update frequency at any time. Moreover, if the user does not choose any scheduling input, a default update schedule may be used.

In accordance with an aspect of the invention, each stored search request is stored in association with a user selectable date and/or time for receiving updates. The system is operative to query the date and/or time fields and determine whether there are any stored search requests that are due for conducting an update.

In the preferred embodiment, the scheduled dispatch engine may interpret the schedule information in a manner that allows for optimizing the load distribution of processing and accommodating various priority levels of queuing and processing based on request or user attributes. An example would be to provide "priority processing" for request of users subscribing to a premium level of access to the system.

The scheduled dispatch engine or process 1000 begins at step 1008, where the scheduled dispatch engine 1000 receives a clock interrupt. Those skilled in the art will understand that a clock interrupt generated within the computer system may be utilized to trigger search updating. At step 1010, the current time is compared to the time of an item in a queue of searches. This queue of searches may be created by querying the stored searches database for any searches whose update date and/or time are earlier than the current date and/or time.

At decision 1014, if the current time is later than the time of any item in the queue, control passes to step 1018, and the search request which is earlier than the current time is retrieved from the stored searches database 219 and submitted to the submit and process engine 500. If the current time is not later than the time of any item in the queue of searches, the routine exits.

In this manner, It will be appreciated that the present invention is operative to conduct updating of searches in accordance with schedule information.

Exemplary Search Results, Processing, and Display Sets

In the preferred embodiment of the present invention, the knowledge engine provides the user with research management functions that allow the user to efficiently manage the received information. For example, two research management functions include the "hide" and "unhide" functions. The "hide" function allows the user to look at a presented set of results and, if the user determines that a particular site is not important or is not useful, the user can hide the listing.

A "hiding" function is invoked by selecting a "hide" control button, as shown in FIG. 17 and described elsewhere. A hidden listing remains in the list stored search results, but does not show up in any future updates, unless and until "unhidden." The "unhide" function gives the user the ability to unhide the listing at a later date.

In the preferred embodiment, the hiding and unhiding applies to all results at a specific "site." This renders all current and future results from that site hidden until the site is "unhidden."

In addition to the "hide" and "unhide" features, the knowledge engine also allows a user to share the knowledge with others. For example, the user may electronically mail the listing and summary provided by the knowledge engine to another user. The user sends the listing from the knowledge engine site as oppose to sending a copy of the item with a browser's send item command.

The research management functions described above are possible because the knowledge engine stores all search results and maintains an ongoing relationship with the user, as opposed to merely statically searching a pre-indexed database.

Referring now to FIG. 11 and FIG. 12, the foregoing described processes result in the production and storage of search results in the stored search results database which are presented to the user in various forms. It will be recalled that in the preferred embodiment of the present invention, each search conducted by a user, i.e. each "shelf" of research maintained by a user, is stored in the stored results database 213. However, not all of the items in the list of search results is presented immediately to the user; rather, a selected subset is typically presented to the user so that the user receives manageable "chunks" of information spread over time. These "chunks" or subset of search items may be viewed and manipulated by the user, and kept or discarded as described herein. Moreover, selected items may be "hidden" so as to minimize distractions to the user and allow the user to focus on the most relevant research.

In this regard, assume in FIG. 11 that an initial search conducted by a user at time $t_1$ has resulted in production of an initial set of raw search results, designated as set 50a. As described above in connection with FIG. 5, the submit and process engine 500 determines that certain of these results may be dead links (resulting in the "error 404", and certain other results may be determined to be irrelevant when examined in context. Accordingly, the initial raw set of 15 search items in set 50a, after processing at time $t_2$, may only constitute a second set or subset 50b of ten items. These ten items in subset 50b are then suitable for communication to the user.

However, in accordance with an aspect of the invention, only a smaller manageable "chunk" or subset of search results is initial communicated to the user. Assume that the third set or subset 60a is initially communicated to the user at time $t_3$, comprising items 1–5. Items 6–10 are still available and stored, but are not initially communicated to the user.

The user may inspect the set 60a and decide that items 2 and 5 are irrelevant, unimportant, or duplicative, and may choose to hide these items. This information is communicated back to the system at time $t_4$, where information indicating that items 2 and 4 are hidden is stored in the stored search results database. This is reflected as set 50c. The user then only views items 1, 3, and 5, of set 60b.

Assume that later at time $t_5$, the scheduled dispatch engine 10000 has conducted a search update #1 from new sources, resulting in new search items 11–15 in set 50*d*. Of these items, the system may determine that item 12 is a dead link, so that only 11 and 13–15 are for communication to the user.

At time $t_6$, the raw search results are processed and stored as set 50*e*, resulting a new set of 13 items, with the dead link item 12 from set 50*d* eliminated. Items 2 and 4 remain hidden.

At time $t_7$, the nonhidden ones of items 1–7 and a selected number of new results 10–12 are communicated to the user as set 60*c*. It will be appreciated that this communication results in the user seeing items 1, 3, 5, 6, 7, 10, 11, and 12.

The user may inspect the set 60*c* and decide that items 7 and 12 are irrelevant, unimportant, or duplicative, and may choose to hide these items. This information is communicated back to the system at time $t_8$, where information indicating that items 2, 4, 7 and 12 are now hidden is stored in the stored search results database. This is reflected as set 50*f*. The user then only views items 1, 3, and 5, 6, 10 and 11 of set 60*d*.

Turning now to FIG. 12 to continue the example, assume that later at time $t_9$, the scheduled dispatch engine 1000 has conducted yet another search update from new sources, resulting in new search items 14–18 of set 50*g*. Of this set 50*g*, the system may determine that item 3 is a now dead link, item 5 is a changed link, and item 17 is a dead line. After processing and elimination of the dead links, a new set 50*h* is produced and stored at time $t_{10}$. Of the items in this set, items 2, 3, 6, and 11 are hidden. Item 4 is now the changed item in the new set. Of the resultant set 50*h*, the system may select additional items for communication to the user at time $t_{11}$, e.g. set 60*e*, consisting of items 1, 4 (changed), 5, 7–10, 12, and 13–14 (new). The hidden items remain in the system as set 50*h*, but are selectively obscured from view.

The above described process may be repeated indefinitely, thereby allowing the user to accumulate knowledge pertaining to a particular topic, receive notification when changed or new items appear, and not be bothered or distracted by dead links.

Exemplary Search and Resultant User Interface

Turn to FIG. 13 for a discussion of an exemplary embodiment of the knowledge engine server 20 and exemplary web based interface to a system constructed in accordance with the preferred embodiment present invention. This exemplary embodiment of the present invention of a knowledge engine server 20 is an illustration of one possible implementation. There are many other possible implementations; therefore, this specific example is not intended in anyway to limit the possible applications of the present invention. The specific implementation of the knowledge engine server 20 that will be discussed in the following screen shots is available at an Internet site having a predetermined URL, for example, http://www.karnak.com. In the discussion of FIG. 13, it assumed that the user is operating a suitable computer running an Internet browser, that the user has navigated to the knowledge engine's login page 1300, and that the user has previously logged into the knowledge engine's Internet site to acquire a membername 1301 and a password 1302, which are entered in corresponding text boxes.

When a user executing an Internet browser enters the Internet site address for the knowledge engine's Internet site, the user will arrive at the user login screen 1300. At the user login screen 1300, the user signs into the system by entering the membername 1301 and password 1302. Once this information is entered, the user must then use the pointing device associated with the user's computer to point and click on the "log in now" button 1303. Clicking on the "log in now" button 1303 submits the membername 1301 and the password 1302 to the knowledge engine server 20. If the user membername and the password are valid, the knowledge engine server 20 presents the user with a "my research" screen 1400, which is illustrated in FIG. 14.

In FIG. 14, the "my research screen" 1100 includes a research request text entry box 1401, one or more research shelves 1 1402*a*, 1402*b*, etc., a set of radio buttons for selection of expert topics 1403–1407, a "go" button 1408, and a suggest improvements check box 1409.

The research text entry box 1401 enables a user to enter a research request on a topic of interest, for example the text <New Hampshire Primary> as discussed above. In addition to allowing the user to enter the search, the "my research screen" 1400 provides the user with two research improvement features. First, the "my research screen" 1400 allows the user to improve the requested search by selecting a particular area of specialization from expert topic radio buttons 1403–1407. As discussed above in connection with FIG. 1, the knowledge engine server 20 uses the selected expert topic to focus the requested search by utilizing a list of sources that are known to be suitable for the indicated area, e.g. medicine, or law, or current events. Preferably, the knowledge engine server 20 will only submit the research request to the sources within the selected expert topic. Therefore, the user receives information from a limited number of sources.

Secondly, the suggestion improvement check box 1409, when selected, triggers the suggest improvements process described in connection with FIG. 3. It will be recalled that this process provides the user with suggestions and tips on how to improve the search request.

When the exemplary "New Hampshire Primary" search is submitted via the "go" button 1408, the suggestion display screen 1500, which is illustrated in FIG. 15, is displayed to provide the user with suggestions or tips. The suggestion display screen 1500 provides the user with suggestions 1501–1504. These suggestions provide the user with the syntax to make words required, to exclude words, and to group words that always appear together. The suggestion display screen 1500 may also provide the user with recommendations that are not related to the use of syntax. For example, the suggestions may recommend that the user not capitalize words within the requested search. If the user wants to accept this recommendation, a "fix it" button 1505 is provided to automatically convert the requested search to lower case letters.

Once the user receives the above recommendations, the user can either use the recommendations and resubmit the requested search for re-analysis via the "try this" button 1506, or the user can proceed with the search by clicking on the "go" button 1508.

If the user decides to proceed with the search by clicking on the "go" button, the knowledge engine server 20 submits the requested search to the sources within the expert group selected by the user and displays a "research submitted" screen such as shown at 1600 in FIG. 16. The research submitted screen 1600 displays the current operation of the knowledge engine 20. The current operation is indicated through information displayed in a researching now area 1601, a current estimated research time are 1602, and the options are 1603. Area 1603 provides the options of 1. viewing the results of the search that is now in progress, 2. returning to the "my research" screen, or 3 stopping the researching and improving the request.

After the search request is complete, the knowledge engine server 20 provides the results to the user in a search results screen 1700 such as shown in FIG. 17. The search results screen 1700 illustrates that each listing found is provided with a page name 1701, the Internet site address or URL 1704, and an indicator 1702 to identify the status of the listing (e.g. new or changed). The Internet site address 1704 is provided as a hyperlink that allows the user to spawn a new window showing the page identified in the hypertext. The indicator 1702 allows the user to track changes in the search results as update searches are conducted, and new listing are included in the search result screen 1700.

In addition to the above, each listing is also provided with a verified date 1708, the Internet page posting date 1703, and a context sensitive summary 1705 of the page. The verified date 1708 is the date that the knowledge engine server 20 located the page, during an initial or update search, and verified that the page was relevant and active. The Internet posting date is simply the date that the page was indexed at the Internet site where the page was found.

Still referring to FIG. 17, the search results screen 1700 also provides the user with various research management functions. The search result screen 1700 provides the send site button or link 1707, a hide site button or link 1706, clear this shelf button or link 1709, show me new button or link 1713, and the results status shelf 1714 features.

The send site button or link 1707 feature allows the user to send a site listing to another email user. The hide site button or link 1706 feature allows the user to hide a site listing from the search result screen 1700. The clear shelf button or link 1709 clears all listings from the current research shelf. The show me new button or link 1713 allows the user to only view new listings in the search result screen 1700; and, the results status shelf 1714 provides the user with a summary of the status of all the research listings found to date.

FIG. 18 illustrates another view of a "my research" screen 1800 and shows that, after conducting a search, a user can store the search results in one or more "research shelves" 1801, 1802, 1803, 1804, and return to a "my research" screen. Once at a "my research" screen, the user can conduct a new search to be stored in one of the available research shelves, or the user can view a previously stored search on one of the shelves.

The user may choose to check the progress of a pending search by clicking on a "Check Progress" button 1810, which takes the user to a screen such as shown in FIG. 16.

The user may send the results of the research to a third party (via e-mail) by clicking on a "Send Shelf" button 1812, which takes the user to a screen such as shown in FIG. 20. Or, the user may delete and clear a shelf for a new research project by clicking on the"Clear Shelf" button 1814.

If the user chooses to view a previously stored search in one of the "shelves," the user can view all new listings by clicking on a "View New" button 1820, view all the listings of a selected search by clicking on a "View All" button 1822, improve the search that was used to create the results in the selected shelve by clicking on an "Improve" button 1824, or change the notification options for the selected shelf by clicking on the "Notify Me" button 1826.

FIG. 19 is an illustration of a screen identified as "How can we improve your research?" 1800. This screen is accessed in various ways, for example by clicking on from an "improve your search" hyperlink in FIG. 16 or an "improve" button 1824 of FIG. 18. The "how can we improve your research" screen 1900 displays the requested search string at 1901, the total number of references found at 1902, radio buttons 1903 to allow user entry of a quality evaluation of the research results (e.g the quality was too vague, about right, or too narrow), and radio buttons to allow user entry of a quantity evaluation of the research results 1904 (e.g. too much, about right, or too little). The user may choose to modify the parameters associated with either the quality evaluation or the quantity evaluation and submit modified parameters for reevaluation by selecting an "improve now" button 1905. In response to the new parameters, the knowledge engine server 20 will provide the user with additional recommendations on how to improve the requested search.

FIG. 20 is an illustration of a "send research results by email" screen 2000. The "send research results by email" screen 2000 may be accessed in various manners, for example through the "sendsite" hyperlink of FIG. 17 or by clicking on the "Send Shelf" button 1812 of FIG. 18. This screen allows the user to click a send references button 2001 and send the references found to an email user whose address is listed in a "To:" address text entry box 2002. The user may also select the "send as HTML message" box 2003 to send the email message in HTML protocol. The user may also enter any desired message to the recipient by typing in a "personal message" text entry box 2004 to send a personal message along with the emailed results. After the above information is entered, the user can either send the message by clicking on the "go" button 2006 or cancel sending the message by clicking on the cancel button 2008.

FIG. 21 illustrates a "research notification" screen 2100 that allows the user to select the manner in which he or she would like to be notified of updates. The user can select from options 2101–2104. Respectively, these options allow a user to (1) receive an email with a brief reminder, (2) receive an email containing links and summaries of just the new and changed items, (3) receive an email containing links and summaries of everything found to date, or (4) not receive any email at all.

In addition to these notification methods, the user may also enter schedule information to select how often updates will be conducted and sent, and the date that the updates should start. The user may select to receive emails once a month by clicking button 2105 or once a week by clicking button 2106. The user may select the start date of the updates by clicking in box 2107 and choosing an appropriate date. After this information is entered, the user either saves the information by clicking on the "save" button 2108 or disregards the information by clicking on the "cancel" button 2109.

FIG. 22 illustrates a new and changed results page 2200 that is displayed to a user when new and/or changed results are provided to the user upon an update. For example, item 2202 is flagged as a "changed" item. Items 2204 are shown as examples of how a number of different pages associated with a single web site, e.g."nih.gov", are displayed together, in contrast to many convention search engines that do not group results from one site together.

Display area 2208 tells the user that of 60 total references stored and accumulated in the selected research shelf, there are 2 new items. Display area 2210 indicates that there are 8 changed items.

From the foregoing, it will now be appreciated that the present invention finds utility for various applications, including, for example, the following:

Professionals can stay current in their field by maintaining research shelves directed to topics of professional interest.

Company executives can track their industry and their competitors.

Marketing departments can watch the market by following their products and the competition.

Legal departments and lawyers can check on the use and misuse of corporate trademarks, servicemarks, and other intellectual properties, and can monitor proposed legal and/or regulatory changes.

Customer service departments can stay abreast of customer perceptions.

Product development managers can gather resources and justifications for new concepts and projects.

Researchers, academic and industry, can assemble and build information knowledge bases.

Journalists can seek background and current information for articles being written.

Experienced Internet users can using the various power features to automate information gathering.

It will now be appreciated that the present invention provides a searching tool that is directed to the problems of finding too much irrelevant information on the Internet as well as managing the volume of information that a user gathers on the Internet. The invention further solves the problem of stale information by providing a searching tool that can contemporaneously index developing Internet content. The invention further provides the user with additional assistance for determining the initial relevancy of each located item to the researched query by providing a contextual search display.

Advantageously, the present invention allows a system to track and maintain a history of each user's searches and results. The invention further satisfies the need for a searching tool that teaches the user to independently enter a better request. Finally, the invention provides searchers with new and updated information based on a previous search request, so as to maintain and accumulate knowledge, rather than merely return unfiltered, meaningless search results.

Although the present invention has been disclosed and described in terms of preferred embodiments, it is not intended that the invention be limited to such embodiments. Modifications within the spirit of the invention will be apparent to those skilled in the art. The scope of the present invention is defined by the claims which follow.

What is claimed is:

1. A method for accumulating and displaying information items obtained via a computer network, comprising the steps of:
   providing a plurality of selectable expert topics, each expert topic comprising one or more network computer accessible sources of information, the information items distributed on the network at addresses identifiable by resource locator links;
   receiving a user search request, a selection of one of the plurality of expert topics, and update schedule information;
   storing the user search request, a selection of one of the plurality of expert topics, and update schedule information;
   in accordance with the update schedule information, providing the user search request to the information sources in the selected expert topic;
   receiving and storing raw search results from the information sources;
   processing the raw search results to eliminate dead resource locator links and duplicate items;
   storing the processed raw search results as stored search results comprising a plurality of stored search items;
   selecting a predetermined subset of the stored search items for communication to the user; and
   communicating the predetermined subset of stored search items to the user, the predetermined subset of stored search items including resource locator links selectable by the user.

2. The method of claim 1, further comprising the step of receiving user commands to hide selected items of the predetermined search results, such that the user is not displayed hidden selected items, but the selected items remain stored as stored search results.

3. The method of claim 1, further comprising the step of updating the stored search results with new search results with an updated search conducted in accordance with the update schedule information.

4. The method of claim 1, further comprising the step of displaying the predetermined subset of stored search items in a contextual display in association with search terms of the user search request.

5. The method of claim 3, further comprising the step of notifying the user of the updated search results via e-mail.

6. The method of claim 3, further comprising the step of identifying new search items in the updated search, and identifying the new search items in a communication to the user.

7. The method of claim 3, further comprising the step of identifying changed search items in the updated search, and identifying the changed search items in a communication to the user.

8. The method of claim 3, further comprising the step of identifying unavailable search items in the updated search, the unavailable items having been available in a prior search, and deleting the unavailable search items from the subset of information provided to the user.

9. The method of claim 1, further comprising the step of analyzing the stored search items and identifying information sources as potential new sources, and testing the potential newsources for use as an information source.

10. The method of claim 1, further comprising the step of tabulating statistics corresponding to the quality of information provided by an information source, in association with a selected expert topic, and assigning a ranking to the information source, and displaying information items from a source of higher ranking to the user before displaying information from a source of lower ranking.

11. The method of claim 1, wherein a plurality of information items from an information source are displayed to the user in a collection associated with information identifying the information source.

12. The method of claim 1, further comprising the steps of identifying a potential new information source from the stored search results, probing the potential new information source, and determining the interface parameters associated with the potential new information source.

13. The method of claim 1, further comprising the step of interacting with the user to modify the search request to obtain better search results.

14. A method for accumulating information items via computer system connection for networked communications, comprising the steps of:
   arranging a plurality of information sources into one or more expert topics;
   searching for information from sources in accordance with prestored source ranking information;
   displaying information retrieved from an information source with a high quality indicator prior to information retrieved from an information source with a lower quality indicator;

re-ranking the information sources within a selected expert topic based on a predetermined quality indicator; and identifying potential new information sources off-line for arrangement into the one or more expert topics.

15. A method for research to obtain a plurality of information items via a networked computer system, comprising the steps of:

providing a plurality of information sources in one or more expert topic categories, the information sources the information items distributed on the network at addresses identifiable by resource locator links;

in response to user input of a search request, applying the search request to one or more of the plurality of information sources;

receiving and storing a first set of search result items received from the one or more information sources;

processing a first set of search result items to eliminate dead resource locator links and thereby obtain a second set of search result items;

presenting a third set comprising a selected subset of the second set of search results to the user; and receiving user input as to hiding selected items in the third set to a user list of selected viewed items, the third set including resource locator links selectable by the user.

16. The method of claim 15, further comprising the step of determining quality of the search result items, and wherein the third set consists of only search result items having a quality exceeding a predetermined threshold.

* * * * *